(12) United States Patent
Ashfield et al.

(10) Patent No.: US 7,707,394 B2
(45) Date of Patent: Apr. 27, 2010

(54) REDUCING THE SIZE OF A DATA STREAM PRODUCED DURING INSTRUCTION TRACING

(75) Inventors: Edmond John Simon Ashfield, Cambridge (GB); Michael John Williams, Ely (GB); John Michael Horley, Linton (GB); Richard Roy Grisenthwaite, Guilden Morden, Nr Royston (GB)

(73) Assignee: ARM Limited, Cambridge (GB)

( * ) Notice: Subject to any disclaimer, the term of this patent is extended or adjusted under 35 U.S.C. 154(b) by 949 days.

(21) Appl. No.: 11/442,593

(22) Filed: May 30, 2006

(65) Prior Publication Data

US 2007/0294592 A1 Dec. 20, 2007

(51) Int. Cl.
*G06F 11/36* (2006.01)
(52) U.S. Cl. .................................... 712/227
(58) Field of Classification Search ............... 712/227; 717/131, 154, 155, 158, 128, 127, 126
See application file for complete search history.

(56) References Cited

U.S. PATENT DOCUMENTS

| | | | |
|---|---|---|---|
| 5,333,283 A | 7/1994 | Emma et al. | |
| 5,758,143 A | 5/1998 | Levitan | |
| 6,014,742 A | 1/2000 | Krick et al. | |
| 6,106,573 A | 8/2000 | Mahalingaiah et al. | |
| 6,115,810 A | 9/2000 | Patel et al. | |
| 6,173,395 B1* | 1/2001 | Wisor et al. | 712/236 |
| 6,233,678 B1 | 5/2001 | Bala | |
| 6,247,146 B1* | 6/2001 | Wheatley et al. | 714/38 |
| 6,314,530 B1* | 11/2001 | Mann | 714/38 |
| 6,513,134 B1 | 1/2003 | Augsburg et al. | |
| 6,647,491 B2 | 11/2003 | Hsu et al. | |
| 6,658,557 B1 | 12/2003 | McCoy et al. | |
| 2001/0032309 A1 | 10/2001 | Henry et al. | |
| 2002/0019930 A1* | 2/2002 | Hsu et al. | 712/237 |
| 2002/0194464 A1 | 12/2002 | Henry et al. | |

(Continued)

FOREIGN PATENT DOCUMENTS

EP 0 999 498 5/2000

OTHER PUBLICATIONS

IEEE-ISTO, The Nexus 5001 Forum Standard for a Global Embedded Processor Debug Interface, Version 2.0, Dec. 2003, pp. 1-157.

(Continued)

*Primary Examiner*—Eric Coleman
(74) *Attorney, Agent, or Firm*—Nixon & Vanderhye P.C.

(57) ABSTRACT

Tracing logic for monitoring a stream of processing instructions from a program being processed by a data processor is disclosed, said tracing logic comprising monitoring logic operable to detect processing of said instructions in said instruction stream; detect which of said instructions in said instruction stream are conditional direct branch instructions, which of said instructions in said instruction stream are conditional indirect branch instructions and which of said instructions in said instruction stream are unconditional indirect branch instructions; said tracing logic further comprising compression logic operable to: designate said conditional direct branch instructions, said conditional indirect branch instructions and said indirect branch instructions as marker instructions; for each marker instruction, output an execution indicator indicating if said marker instruction has executed or a non-execution indicator indicating if said marker instruction has not executed and not output data relating to previously processed instructions that are not marker instructions.

24 Claims, 12 Drawing Sheets

U.S. PATENT DOCUMENTS

| | | |
|---|---|---|
| 2003/0023959 A1 | 1/2003 | Park |
| 2003/0051122 A1* | 3/2003 | Sato .......................... 712/227 |
| 2003/0065912 A1 | 4/2003 | Hum et al. |
| 2004/0030962 A1* | 2/2004 | Swaine et al. ................. 714/45 |
| 2004/0064685 A1* | 4/2004 | Nguyen et al. ............. 712/227 |
| 2004/0215720 A1 | 10/2004 | Alexander et al. |
| 2007/0162895 A1 | 7/2007 | Altman et al. |

OTHER PUBLICATIONS

U.S. Appl. No. 11/442,594, filed May 30, 2006, Williams et al.

* cited by examiner

| 1 | 2 | 3 | 4 | 5 | 6 | 7 | 8 | |
|---|---|---|---|---|---|---|---|---|
| | Instruction stream | | | Embodiment of the present invention | | | | |
| Seq | PC | Instruction | Exec | Marker | Atom | Cnt | Output | |
| 1 | 0x801c | SUB r12,r12,#1 | Y | N | | 1 | | |
| 2 | 0x8020 | CMP r0,r1 | Y | N | | 2 | | |
| 3 | 0x8024 | BEQ 0x8064 | N | Y (cc) | N | 0 | | |
| 4 | 0x8028 | LDM r0!,{r4-r6} | Y | N | | 1 | | |
| 5 | 0x802c | CMP r4,r5 | Y | N | | 2 | | |
| 6 | 0x8030 | BEQ 0x8020 | N | Y (cc) | N | 0 | | |
| 7 | 0x8034 | TST r4,#1 | Y | N | | 1 | | |
| 8 | 0x8038 | ADDNE r4,r4,r11 | N | Y (cc) | N | 0 | | |
| 9 | 0x803c | TST r5,#1 | Y | N | | 1 | | |
| 10 | 0x8040 | ADDNE r5,r5,r11 | N | Y (cc) | N | 0 | P4 | F4=1, F3=1, F2=1, F1=1 |
| 11 | 0x8044 | TST r5,#2 | Y | N | | 1 | | |
| 12 | 0x8048 | ADDNE r5,r5,r11 | Y | Y (cc) | E | 0 | | |
| 13 | 0x804c | BIC r5,r5,#3 | Y | N | | 1 | | |
| 14 | 0x8050 | SUBS r6,r6,#4 | Y | N | | 2 | | |
| 15 | 0x8054 | LDRCS r7,[r4],#4 | Y | Y (cc) | E | 0 | | |
| 16 | 0x8058 | STRCS r7,[r5],#4 | Y | Y (cc) | E | 0 | | |
| 17 | 0x805c | BHI 0x8050 | Y | Y (cc) | E | 0 | | |
| 18 | 0x8050 | SUBS r6,r6,#4 | Y | N | | 1 | | |
| 19 | 0x8054 | LDRCS r7,[r4],#4 | N | Y (cc) | N | 0 | PN | E[3:0]=4, N=1 |
| 20 | 0x8058 | STRCS r7,[r5],#4 | N | Y (cc) | N | 0 | | |
| 21 | 0x805c | BHI 0x8050 | N | Y (cc) | N | 0 | | |
| 22 | 0x8060 | B 0x8020 | Y | N | | 1 | | |
| 23 | 0x8020 | CMP r0,r1 | Y | N | | 2 | | |
| 24 | 0x8024 | BEQ 0x8064 | N | Y (cc) | N | 0 | | |
| 25 | 0x8028 | LDM r0!,{r4-r6} | Y | N | | 1 | | |
| 26 | | ** IRQ Exception | | | | 0 | P3 | F3=1, F2=1, F1=1 |
| | | | | | | | B1 | C=1, A[5:0]=b00010 |
| | | | | | | | B2 | C=1, A[12:6]=0 |
| | | | | | | | B3 | C=1, A[19:13]=0 |
| | | | | | | | B4 | C=1, A[26:20]=0 |
| | | | | | | | B5A | C=1, A[29:27]=0 |
| | | | | | | | B6 | C=1, TEE=0, CAN=0, X[3:0]=b1110, NS=0 |
| | | | | | | | B7 | I[4:0]=1 |
| 27 | 0x0018 | LDR pc,[pc,#20] | Y | Y (ib) | | 0 | B1 | C=1, A[5:0]=0 |
| | | | | | | | B2 | C=0, A[12:6]=b0010000 |
| 28 | 0x1000 | SUB lr,lr,#4 | Y | N | | 1 | | |
| | | | | Total amount of trace data produced: | | | 12 bytes | |

Fig. 7A

| 1 | 2 | 3 | 4 | 5 | 6 | 7 | 8 |
|---|---|---|---|---|---|---|---|
| | \multicolumn{3}{c}{Instruction stream} | | XScale® trace | | ETM® trace | |
| # | Addr | Instruction | Executed | Cnt | Output | Atom | Output |
| 1 | 0x801c | SUB r12,r12,#1 | Y | 1 | | E | |
| 2 | 0x8020 | CMP r0,r1 | Y | 2 | | E | |
| 3 | 0x8024 | BEQ 0x8064 | N | 3 | | N | [PN] E[3:0]=2, N=1 |
| 4 | 0x8028 | LDM r0!,{r4-r6} | Y | 4 | | E | |
| 5 | 0x802c | CMP r4,r5 | Y | 5 | | E | |
| 6 | 0x8030 | BEQ 0x8020 | N | 6 | | N | [PN] E[3:0]=2, N=1 |
| 7 | 0x8034 | TST r4,#1 | Y | 7 | | E | |
| 8 | 0x8038 | ADDNE r4,r4,r11 | N | 8 | | N | [P2] F2=1, F1=0 |
| 9 | 0x803c | TST r5,#1 | Y | 9 | | E | |
| 10 | 0x8040 | ADDNE r5,r5,r11 | N | 10 | | N | [P2] F2=1, F1=0 |
| 11 | 0x8044 | TST r5,#2 | Y | 11 | | E | |
| 12 | 0x8048 | ADDNE r5,r5,r11 | Y | 12 | | E | |
| 13 | 0x804c | BIC r5,r5,#3 | Y | 13 | | E | |
| 14 | 0x8050 | SUBS r6,r6,#4 | Y | 14 | | E | |
| 15 | 0x8054 | LDRCS r7,[r4],#4 | Y | 15 | | E | |
| 16 | 0x8058 | STRCS r7,[r5],#4 | Y | 0 | ROLLOVER | E | |
| 17 | 0x805c | BHI 0x8050 | Y | 0 | [DB] C[3:0]=0 | E | |
| 18 | 0x8050 | SUBS r6,r6,#4 | Y | 1 | | E | |
| 19 | 0x8054 | LDRCS r7,[r4],#4 | N | 2 | | N | [PN] E[3:0]=8, N=1 |
| 20 | 0x8058 | STRCS r7,[r5],#4 | N | 3 | | N | |
| 21 | 0x805c | BHI 0x8050 | N | 4 | | N | [P2] F2=1, F1=1 |
| 22 | 0x8060 | B 0x8020 | Y | 0 | [DB] C[3:0]=4 | E | |
| 23 | 0x8020 | CMP r0,r1 | Y | 1 | | E | |
| 24 | 0x8024 | BEQ 0x8064 | N | 2 | | N | [PN] E[3:0]=2, N=1 |
| 25 | | ** IRQ Exception | | 0 | [E] V[2:0]=IRQ, C[3:0]=2 | | [B1] C=1, A[5:0]=b00010 [B2] C=1, A[12:6]=0 [B3] C=1, A[19:13]=0 [B4] C=1, A[26:20]=0 [B5A] C=1, A[29:27]=0 [B6] TEE=0, CAN=0, X[3:0]=b1110, NS=0 |
| 26 | 0x0018 | LDR pc,[pc,#20] | Y | 0 | [IB1] C[3:0]=0 [IB2] A[31:24]=0 [IB3] A[23:16]=1 [IB4] A[15:8]=0 [IB5] A[7:0]=0 | E | [PN] E[3:0]=1, N=0 [B1] C=1, A[5:0]=0 [B2] C=0, A[12:6]=b0010000 |
| 27 | 0x1000 | SUB lr,lr,#4 | Y | 1 | | E | |
| | | Total amount of trace data produced: | | | 9 bytes | | 16 bytes |

Fig. 7B (PRIOR ART)

REDUCING THE SIZE OF A DATA STREAM PRODUCED DURING INSTRUCTION TRACING

CROSS REFERENCE TO RELATED APPLICATIONS

Related co-pending U.S. patent application Ser. No. 11/442,594, filed May 30, 2006, Williams et al, is commonly owned and herein incorporated by reference.

BACKGROUND OF THE INVENTION

1. Field of the Invention

The field of the invention relates to data processing and in particular to diagnostic mechanisms for monitoring data processing operations.

2. Description of the Prior Art

There are a number of situations where it is desirable to keep track of the processing being performed by a processing circuit, and in such situations it may be desirable to be able to identify an order that instructions are processed in and to determine at any point in time which instruction is being processed. For example, such information is useful during the development of data processing systems, where it is often desirable to track the activity of the processing circuit. An example of a tool that may be used to assist in such a process is a tracing tool.

Tracing the activity of a data processing system whereby a trace stream is generated including data representing the step-by-step activity within the system is a highly useful tool in system development. Such tracing tools use a variety of means for tracing the program flow including embedded trace macrocells (ETM, a trademark of ARM Limited, Cambridge) which are present on the chip whose processing is being monitored.

Most processor instruction set architectures include branch instructions that are conditional on the state of the data processing system at the point where the branch is processed, that is they will execute and branch to the destination if some condition is true, and not execute and continue to the next sequential instruction if the condition is false, that is, it is treated as a no-op operation. Most instruction set architectures also include an indirect branch instruction, where the destination of the branch is calculated from the current state of the data processing system at the point where the branch is processed. The ARM® instruction set architecture, which is documented in the ARM Architecture Reference Manual, ISBN 0-201-73719-1 of 2001 also includes conditional instructions that are not branch instructions, which either execute or not depending on the current state of the processor at the point when the instruction is processed. Other instruction set architectures also include such conditional, sometimes referred to as predicated, instructions. Instructions that are not conditional—those that always execute—are referred to as unconditional instructions.

Current protocols used on Embedded Trace Macrocells for non-cycle-accurate trace of existing ARM® (registered trade mark of ARM Limited, Cambridge) processor cores has evolved from that used for cycle-accurate trace. Thus, for every instruction in a stream the ETM codes the information from the CPU as either an E-atom (when the instruction is executed) or an N-atom (when the instruction was not executed). The ETM then emits a data stream with the sequence of E and N-atoms that occurred. Generally these are emitted in a compressed form, using encoding techniques such as run-length encoding.

This is described in the ARM Embedded Trace Macrocell Architecture Specification, ARM IHI 00141 of December 2002.

This data stream can be stored either on- or off-chip and can then be fed to a debug agent program called an ETM decompressor. The decompressor has a copy of the program being traced so by decoding the E and N-atoms, and other information in the data stream which encodes data dependent changes to program flow (such as indirect branches) it can reconstruct the program flow in the embedded CPU.

As data processor cores increase their operating frequency and processors having multiple cores are becoming more common there is a need to improve the debug and tracing tools and mechanisms that may be used within the development of data processing systems. Increasing core frequencies pose a particular problem for trace. For example in existing ARM processor cores and ETM protocols, a bit rate of about 1.2 to 1.6 bits per instruction is achieved with instruction-only trace. Therefore a 1 GHz processor processing one instruction per cycle would generate 1.2 to 1.6 gigabits per second of trace data, this data may need to be taken off-chip and stored in a buffer. Furthermore, multi-processor system introduce integer multiples to this data rate.

Compression is used to reduce the average number of bits used to trace an individual instruction. However, as ever faster cores need to be traced, it would be advantageous to be able to reduce this data rate further.

Another known way of tracing the data activity of a data processing system is that embodied in the data processing system produced by Intel® under the name of XScale®. This is described in the Intel Developers Manual of January 2004 entitled Intel® XScale® core.

In this trace mechanism, instead of outputting details of every instruction that executes or does not execute XScale® counts the instructions that are processed until it gets to a branch instruction that is executed. Thus, it outputs a number of instructions processed and information as to where the program has branched to. Thus, if it passes a conditional branch instruction that does not execute, no information on this instruction is output as it never outputs non-execution indicators, unlike the other conventional trace mechanism described above. One disadvantage with XScale® is that by not outputting information on conditional branch instructions that do not execute, the indicator of a conditional branch instruction that does execute must contain sufficient information for the trace decompressor to determine which of the possible branch instructions in the instruction stream is the one that executed, which takes the form of a counter requiring many bits to encode. In addition, because this counter counts all instructions processed that are not executed branch instructions, overflows of this counter are likely, and the trace stream therefore also has to encode overflow markers. A second disadvantage is that it only outputs information for branch instructions, and not other conditional instructions; thus, the trace is incomplete, limiting the number of situations where it is useful.

SUMMARY OF THE INVENTION

A first aspect of the present invention provides tracing logic for monitoring a stream of processing instructions from a program being processed by a data processor, said tracing logic comprising monitoring logic operable to: detect processing of said instructions in said instruction stream; detect which of said instructions in said instruction stream are conditional direct branch instructions, which of said instructions in said instruction stream are conditional indirect branches and which of said instructions in said instruction stream are unconditional indirect branch instructions; said tracing logic further comprising compression logic operable to: designate said conditional direct branch instructions, said conditional indirect branch instructions and said unconditional indirect branch instructions as marker instructions; and for each marker instruction, output an indicator indicating a behaviour of said data processor when said marker instruction is processed and not output data relating to processed instructions that are not marker instructions.

In order to address the problem of the ever increasing quantity of data captured during a trace of processor program flow for processors which operate at ever increasing speeds, and in some cases have multiprocessors operating together, the present invention recognises that some of the information that generally forms part of the trace does not need to be output as it can be inferred and as such a reduced quantity of information can be output. In this regard, the present invention designates conditional direct branch instructions, conditional indirect branch instructions and unconditional indirect branch instructions, i.e. at least some of the instructions that it is not possible to statically determine the behavior of, as marker instructions. These instructions are important as the program behaviour at the points where these instructions are processed is dependent on some factor that is determined dynamically, i.e. during the running of the program. Thus, when tracing an instruction stream, it is important that it is known what the behaviour of the processor is when these conditional direct branch instructions, conditional indirect branch instructions (collectively, conditional branch instructions) or unconditional indirect branch instructions are processed. That is, are the conditions of the conditional branch instruction fulfilled, and where do the indirect branch instructions branch to? Other instructions which are not designated as marker instructions will generally behave in a known way and thus, it has been recognised that this information need not be output. Thus, the program stream can be traced just from information regarding the behaviour of marker instructions and knowledge of the program itself. This significantly reduces the amount of data that needs to be output to trace the instruction stream.

It will be appreciated that whereas only indirect branch operations and conditional branch instructions constitute marker instructions for the purposes of simple instruction trace, for other forms of trace, other classes of instruction may also be required to be designated as marker instructions.

In some embodiments, said monitoring logic is further operable to detect which of said instruction stream are conditional instructions; and said compression logic is further operable to designate said conditional instructions as marker instructions.

By further designating conditional instructions as marker instructions, in addition to conditional branch instructions and unconditional indirect branch instructions, the tracing logic outputs indicators indicating the behavior of all instructions that it is not possible to statically determine the behavior of. Although the behavior of these instructions does not have to be traced in order to fully determine the instruction stream processed by the data processor, it is often advantageous when debugging the program to trace the behaviour of these instructions, so that the full behavior of the program can be determined. Thus, when tracing a program stream, it is important that it is known whether the conditions of the conditional instruction are fulfilled.

In some embodiments, said monitoring logic is further operable to detect which of said instruction stream are data memory transfer instructions; and said compression logic is further operable to designate said data memory transfer instructions as marker instructions.

Instruction trace is often extended to include tracing of data memory transfers generated by data memory transfer instructions executed on the data processing apparatus. However, it has been observed that tracing all data memory transfers, which typically consist of a data memory address and one or more data memory values, results in large amounts of trace data being generated. Therefore existing implementations of tracing logic includes means to filter the data memory transfers, usually based on the address part of the transfer. In such a system, every data memory transfer instruction can potentially generate trace, but only some do. It is a requirement to be able to determine which data memory transfer instructions generated the traced data memory transfers. By regarding all data memory transfer operations as marker instructions, the trace stream contains sufficient information to associate the traced data memory transfers with the data memory transfer instructions, at a relatively low cost, as the indicator for the behavior of those data memory transfer instructions which did not generate a traced data memory transfer only has to indicate the processing of a data memory transfer instruction.

In some embodiments, said compression logic is operable in response to detection of said indirect branch instructions being processed, to output an indication of where said instruction has branched to as said indicator.

The indicator can take a number of forms, provided that it gives some indication as to the behaviour of the processor. In the case of indirect branch instructions it has been found advantageous to output information as to where the instruction has branched to as the indicator. Receipt of this information shows both that the indirect branch instruction has been taken and where the program then branches to. Thus, this is an efficient way of outputting both an execution indication and the further information required for the trace.

In some embodiments, said monitoring logic further comprises a counter, and is further operable to: count a number of non-marker instructions that are processed following each marker instruction using said counter; and detect an exception event; and said compression logic is operable in response to detection of said exception event to: output an exception indicator indicating taking of said exception along with said counter value.

If an exception event occurs during the running of the program, it is then important when tracing the program to know at which point this exception event occurred. Thus, although in general instructions which are not designated as marker instructions do not need to have information concerning their processing output, in the case of an exception occurring this is important as it is needed to locate the position that the exception event occurred. Thus, a counter is used to count how many instructions are processed between marker instructions. This information can generally be discarded on reaching the next marker instruction, and the counter reset to an initial value, however, if an exception event occurs before this, this information is output along with an indicator indicating that the exception event has occurred. Following output of this information the counter may be reset or it can continue to count. As the count value has been output if it continues to count the place that a next exception occurs can be derived from the output value and the value of the counter at that point.

In some embodiments, said compression logic is operable in response to said counter value passing a predetermined value, to designate said non-marker instruction reached as a marker instruction irrespective of the nature of said next instruction, and to reset said counter.

The number of instructions that occur between marker instructions varies and may in some circumstances be large. Thus, if these instructions are to be counted a large counter would need to be provided to cope with all eventualities. In order to avoid the need to have a counter able to count large numbers, it has been found advantageous to reset the counter when it counts past a predetermined value (generally the maximum value of the counter, although it could be the minimum if the counter is counting down) and to designate or promote the next instruction as a marker instruction. This is an efficient way of not having an unreasonably large counter and yet still knowing where in the program stream an exception event occurs. An alternative would be to output a "counter reset" indicator whenever the counter counts past the predetermined value and hence is reset. A disadvantage of this is that it is an additional piece of information that would need its own format to be recognised. Marker instructions by contrast are already used. As should be clear to a skilled person, a counter can be implemented in a number of ways, all of which are functionally equivalent; including counting up from zero to a maximum number and counting down from an initial maximum to zero.

In some embodiments, said monitoring logic is further operable to detect which of said instruction stream are unconditional direct branch instructions; and said compression logic is further operable to designate said unconditional direct branch instructions as marker instructions.

By designating all branch instructions, direct or indirect, conditional or unconditional, as marker instructions, the trace stream contains only information about the points in the instruction stream where discontinuities in program flow may exist. Unconditional direct branch branches normally do not need to be traced as their behavior can be statically determined without reference to the trace stream, that is, it can always be determined where the instruction branches to (because the branch is direct), and that it always branches (because it is unconditional). However, by tracing these instructions, the program behaviour between the traced marker instructions consists only of instructions at sequential locations in the program, and this can be advantageous in some forms of processing.

In some embodiments, said monitoring logic is further operable to detect an exception event; and said compression logic is operable in response to detection of said exception event to output an exception indicator indicating taking of said exception along with a value indicative of the location in said program where said exception occurred.

If an exception event occurs during the running of the program, it is then important when tracing the instruction stream to know at which point this exception event occurred. Typically, the location in the program will suffice, as, for most code sequences, an instruction at any given location will only be processed once between two marker instructions, although certain code sequences exist where a location is repeatedly executed due to an unconditional direct branch. Thus, the location of the exception in the instruction stream can typically be indicated by outputting a value indicative of the location of the exception in the program.

In some embodiments, said compression logic is operable prior to outputting said indicators, to compress the stream of indicator data and to output said compressed data in its place.

It is advantageous to further reduce the data output by compressing the data regarding indicators and to output the compressed data. By analysing sets of instructions and the behaviour of conditional or indirect branch instructions, patterns of indicators that frequently occur can be found and these patterns can be coded in a few bits, such that the data output is compressed.

In some embodiments said tracing logic is further operable to determine if a behavior of at least one of said marker instructions can be determined from a behavior of previous marker instructions, said tracing logic being operable to demote said at least one marker instruction to an instruction that is not a marker instruction.

It may be that the behavior of some instructions that cannot be statically determined can nonetheless be dynamically determined in that the behavior of previously processed instructions provides sufficient information in the trace stream to be able to determine how a particular indirect branch instruction or conditional instruction will be processed. In such circumstances knowledge of their behavior can be derived without the need for a separate indicator in the trace stream. Thus, the data stream can be further reduced by not designating such instructions as marker instructions and therefore not outputting an indication of their behavior.

A second aspect of the present invention comprises a data processing apparatus comprising a data processor operable to process said stream of program instructions and tracing logic according to a first aspect of the present invention.

In some embodiments, said data processing apparatus further comprises: prediction logic operable to provide at least one prediction of a processing behaviour of at least one of said marker instructions; and wherein said monitoring logic is operable to determine from said monitored behaviour whether or not said at least one prediction is correct; and for said at least one marker instruction output as said indicator an indication at to whether or not said at least one prediction is correct.

The use of prediction logic to predict the behaviour of at least one marker instruction may enable the amount of data in the trace data stream to be reduced. This is because of two things. Firstly, the symbol sending a "correct prediction indication" may be a simple Boolean or in the case of many predictions, an enumeration. This may require less data than may have had to be output to trace exactly what occurred. Secondly, if the prediction scheme generally produces correct predictions, the sequence of prediction outcomes may well be more compressible using simple compression techniques than the original data. Thus, the amount of trace data output can be reduced.

In some embodiments said prediction logic is operable to provide a prediction for at least one conditional instruction, said prediction logic being operable to predict whether the condition of said conditional instruction will be true or false, said indicator for said at least one conditional instruction comprising a prediction correct indication if said prediction is correct and prediction incorrect indication if said prediction is incorrect.

The predicting of conditional instructions can be done by predicting whether the condition relating to the conditional instruction will be true or false. The monitoring logic can determine from the monitored behaviour if the prediction is correct and a suitable indicator output.

In some embodiments, said prediction logic is operable to provide a plurality of predictions as to a corresponding plurality of steps of said behaviour of said portion of said data processing apparatus, said tracing logic being operable to determine whether or not at least some of said plurality of predictions are correct and to produce a corresponding at least some of said plurality of prediction indicators said compression logic being operable to compress said at least some of said plurality of prediction indicators to produce compressed data and said tracing logic is operable to output said compressed data.

Generally, the prediction logic provides a plurality of predictions corresponding to a plurality of steps of the behaviour of the portion of the data processing apparatus being monitored. The tracing logic then determines whether or not they are correct and then uses compression logic to compress this information. This is advantageous as if the predictions scheme is one where it can be expected that the majority of predictions will be correct. It has been seen that data where values are unevenly distributed between the possible set of values can be more readily compressed than data where the data values are evenly distributed between the possible set of values.

It has been observed that, when the tracing logic is constructed such that information relating to the execution of non-marker instructions is not output, the resulting output consists of: firstly, indicators of indirect branch instructions; secondly, indicators as to the execution or non-execution of conditional instructions, where the distribution of "executed" and "not executed" indicators in this second part of the output is generally seen to be even. Where a prediction algorithm is used, these "executed" and "not executed" indicators can be replaced with "prediction correct" and "prediction incorrect" indicators which, if the prediction is generally correct, are far less evenly distributed and hence can be better compressed.

In some embodiments, said tracing logic comprises an Embedded Trace Macrocell.

In some embodiments, said data processing apparatus further comprises a data store, wherein said compression logic is operable to output data to said data store.

Although, in some embodiments the compression logic outputs the data to an external apparatus, in other embodiments it simply outputs it to a data store within the data processing apparatus itself.

In some embodiments, said data processing apparatus further comprises a program data store for storing said program and decompression logic said decompression logic being operable to receive data output by said compression logic and to determine a program flow from said execution and non-execution indicators of said marker instructions and said stored program.

Although the decompression logic and program data store can be formed in a separate diagnostic apparatus, in some embodiments they are provided on the same data processing apparatus that is processing the instructions. Thus, a single data processing apparatus can both process a program flow and trace it.

A third aspect of the present invention comprises a diagnostic apparatus operable to receive a data stream output from tracing logic monitoring a data processor, said data stream comprising indicators indicating a behavior of said data processor when marker instructions are processed and not comprising data relating to processed instructions that are not marker instructions, said marker instructions comprising conditional direct branch instructions, conditional indirect branch instructions and unconditional indirect branch instructions, said diagnostic apparatus comprising decompression logic and a data store, said data store being operable to store said instructions of said program being processed by said data processor, said decompression logic being operable to receive said data stream and to determine a program flow from said indicators of said marker instructions and said stored program.

The information output by the tracing logic of the first aspect of the present invention can be received and analysed by a diagnostic apparatus according to the third aspect of the present invention. The decompression logic is able to determine the program flow simply from the execution and non-execution indicators of the marker instructions and knowledge of the program that is being processed by the data processor being analysed.

In some embodiments, said diagnostic apparatus further comprises a buffer operable to receive and store said data stream, prior to forwarding it to said decompression logic.

A buffer is advantageous between the tracing logic and the diagnostic apparatus and is therefore generally provided.

A fourth aspect of the present invention provides a method of monitoring a stream of processing instructions from a program being processed by a data processor, said method comprising the steps of: detecting processing of said instructions in said instruction stream; detecting which of said instructions in said instruction stream are conditional instructions and which of said instructions in said instruction stream are, conditional indirect branch instructions or unconditional indirect branch instructions; designating said conditional direct branch instructions, said conditional indirect branch instructions and said unconditional indirect branch instructions as marker instructions; for each marker instruction, outputting an execution indicator indicating if said marker instruction has executed or a non-execution indicator indicating if said marker instruction has not executed and not outputting data relating to previously processed instructions that are not marker instructions.

A fifth aspect of the present invention provides a method of diagnosing a program being processed by a data processor, comprising: receiving data output by performing a method according to a fourth aspect of the present invention; storing said instructions of said program being processed by said data processor within a data store; determining a program flow of said program being processed from said execution and non execution indicators of said marker instructions and said stored program.

A sixth aspect of the present invention provides a computer program product which is operable when run on a data processor to control the data processor to form the steps of the method according to a fifth aspect of the present invention.

The above, and other objects, features and advantages of this invention will be apparent from the following detailed description of illustrative embodiments which is to be read in connection with the accompanying drawings.

BRIEF DESCRIPTION OF THE DRAWINGS

FIG. 7A shows an example sequence of instructions processed and the resultant output according to an embodiment of the present invention;

FIG. 7B shows the same example sequence of instructions processed and the resultant output of conventional trace systems;

DESCRIPTION OF THE PREFERRED EMBODIMENTS

Figure 1:
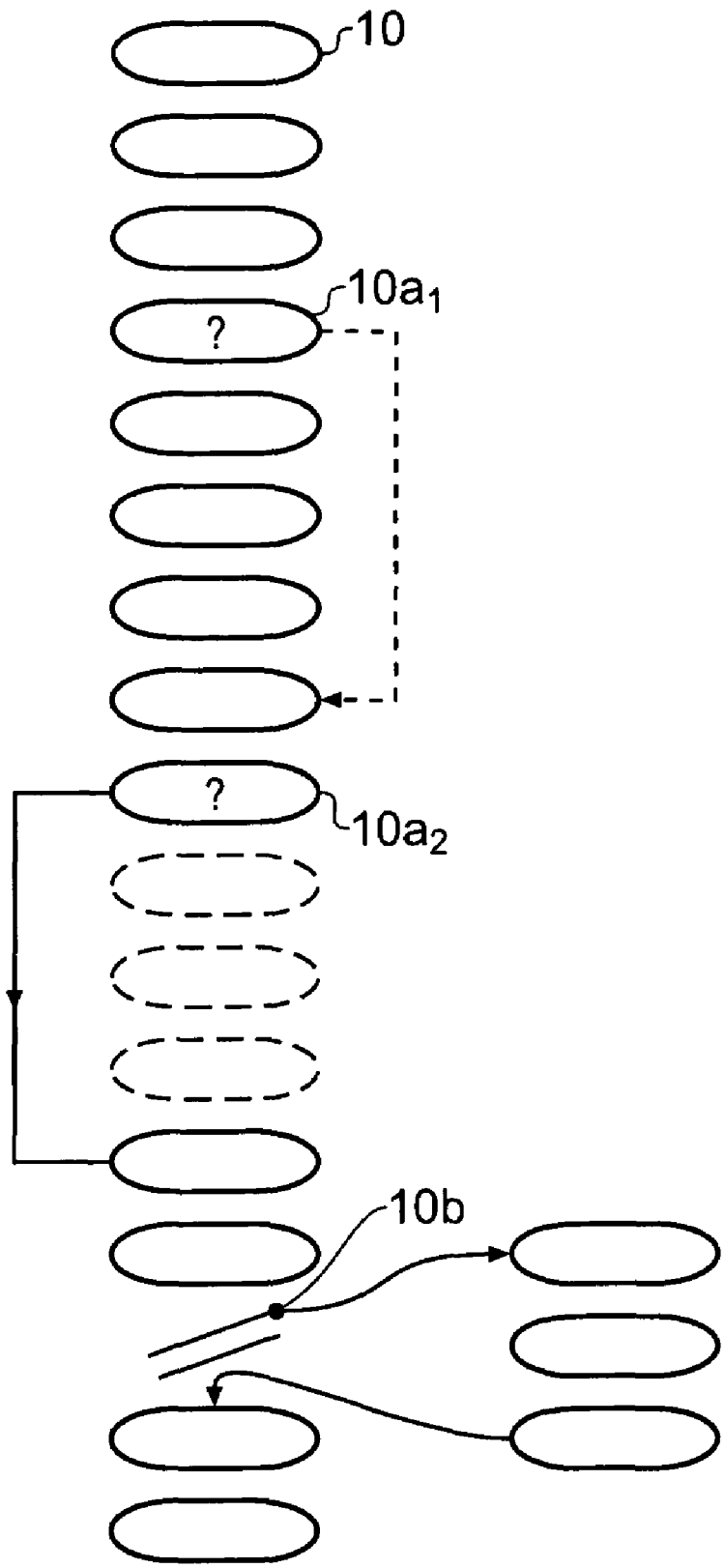
FIG. 1 shows traces of a program flow according to an embodiment of the present invention.

FIG. 1 shows in very simple schematic form a stream of instructions 10 being processed, the instruction stream including conditional branch instructions 10a1 and 10a2 and exception event 10b.

In this embodiment of the invention, for the instructions shown only marker instructions have information output about them. Thus in this case an N-atom is output for the non-execution of instruction 10a1 and an E-atom is output for the execution of instruction 10a2. An exception indication and a count value indicating the number of instructions to have been executed following the previous marker instruction 10a2 is output in response to exception event 10b.

Figure 2:
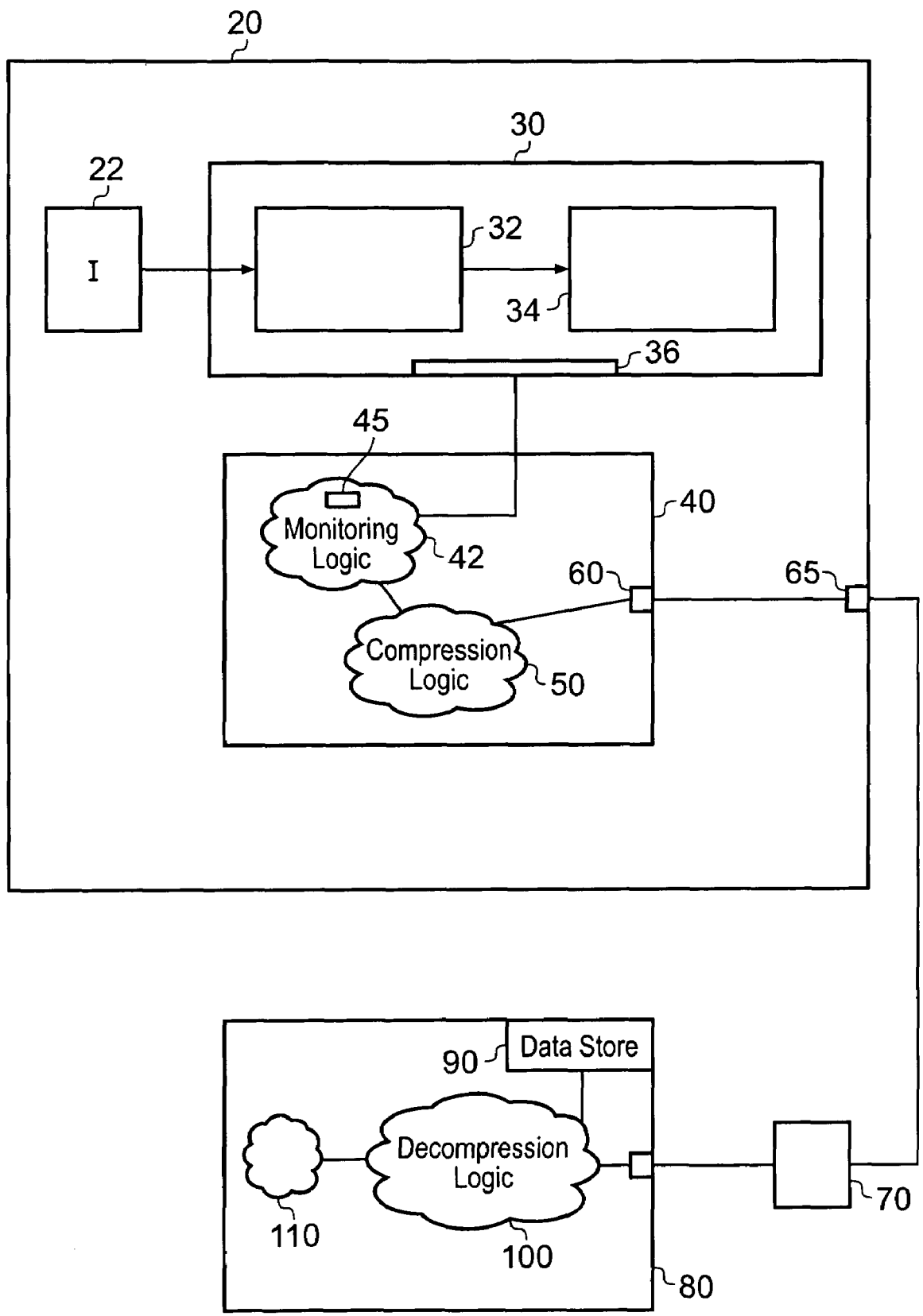
FIG. 2 shows a data processing apparatus comprising an Embedded Trace Macrocell according to an embodiment of the present invention and a diagnostic apparatus for analysing the program flow according to an embodiment of the present invention.

FIG. 2 shows a data processing apparatus 20 comprising a CPU 30 operable to process a program comprising an instruction stream sent from an instruction memory 22. The CPU 30 comprises an instruction fetch unit 32, a pipeline 34 and a trace interface 36. The data processing apparatus also comprises an Embedded Trace Macrocell (ETM) 40 operable to trace the processing of the program via trace interface 36. ETM 40 comprises monitoring logic 42 having a counter 45 and compression logic 50. Monitoring logic 42 monitors the processing of instructions within the CPU 30 and increments the counter 45 for each instruction processed that it has not designated as a marker instruction. It designates instructions that are conditional branch instructions or indirect branch instructions, i.e. at least some of the instructions whose behaviour cannot be statically determined, as marker instructions. When it designates an instruction as a marker instruction it resets the counter and discards the information previously stored therein.

Because trace is typically stored in a circular buffer, that is, a buffer where new entries overwrite the oldest entries, the trace stream typically also includes synchronization data, output periodically by the ETM. This synchronization data contains sufficient information for decompression logic to start decompression of the trace from that synchronization point. Therefore the counter value must be known at the point of synchronization. One method to achieve this is to include the counter value in the synchronization data, although it has been found that a preferred method is to simply reset the counter at the synchronization point.

When an exception event occurs, monitoring logic 42 also detects this and forwards this information along with the value of the counter (indicative of the number of non-marker instructions that have executed since the last marker instruction) at this point to compression logic 50. It then resets the counter.

The compression logic 50 therefore receives a data stream indicating the behaviour of the processor when processing marker instructions, counter values and indications that exception events have occurred. It generally compresses this information and outputs it via output port 60, which in this case is connected to an output port 65 on the data processing apparatus 20. Thus, a data stream of execution and non-execution indicators and exception event indicators along with counter values are output. The indicators may take a number of forms, for example, they may contain the address of where the program branched to. Similarly the exception event indicators may take a number of forms such as the nature of the exception or where the program has branched to.

The information output from data processing apparatus 20 is generally compressed by compression logic 50, and this will be described later. It is received by trace port adapter 70 and is then forwarded to diagnostic apparatus 80. Trace port adaptor 70 may buffer the information until such time as diagnostic apparatus 80 requests it, or it may forward the information directly to diagnostic apparatus 80. Diagnostic apparatus 80 may take a number of forms, and in this embodiment comprises a host computer that runs a debug program 110. Diagnostic apparatus 80 further comprises a data store 90 which contains an image of the program that is being run on the CPU 30. This enables decompression logic 100 to reconstruct the program flow of the program being processed using the information in the data store 90 regarding the program being processed and the information regarding the behaviour of the marker instructions and any exception events. This trace information is passed to a debug program 110 on the host computer, which displays and/or analyses it. Decompression logic can take a number of different forms but in many embodiments is implemented as a software program.

Figure 3:
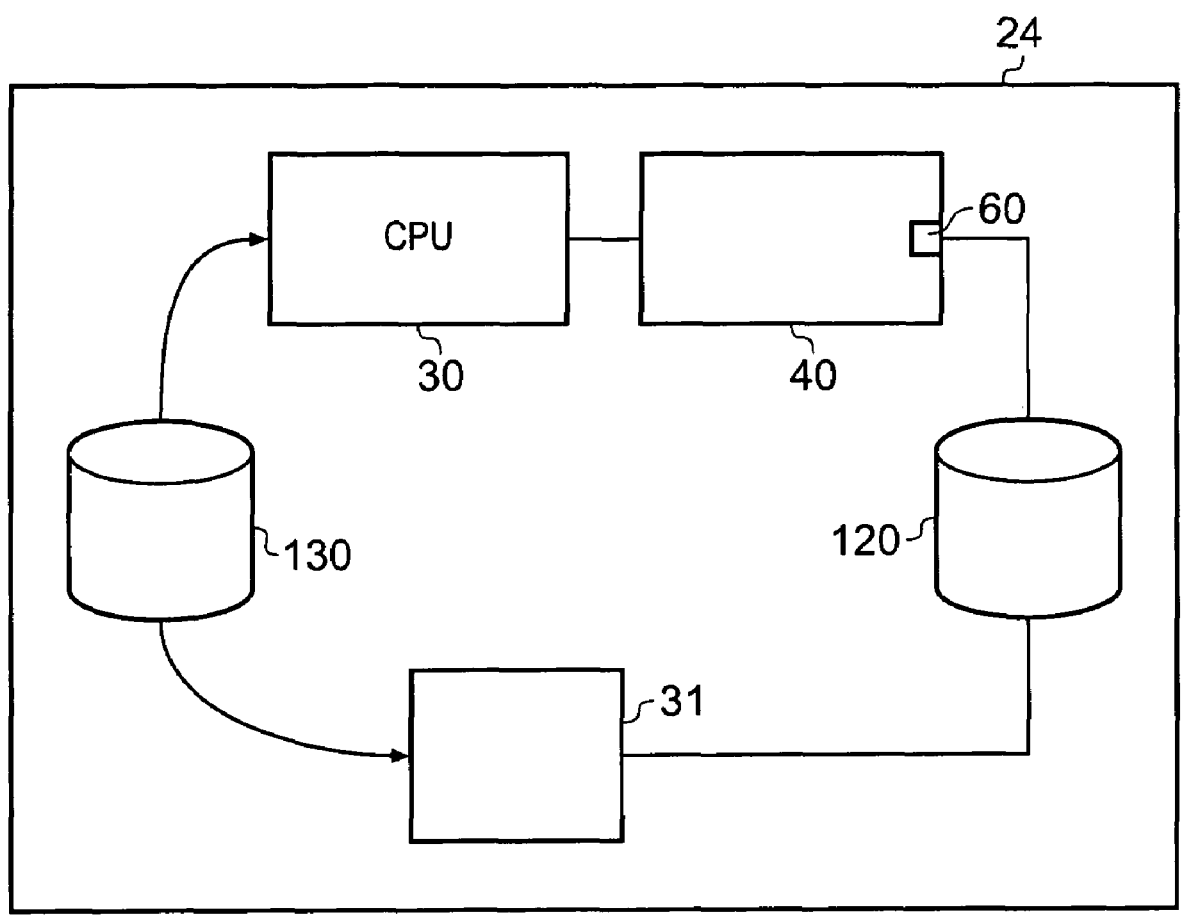
FIG. 3 shows a system comprising tracing logic and decompression logic according to an embodiment of the present invention.

FIG. 3 shows a system according to a further embodiment of the present invention. The system 24 comprises ETM 40, with output port 60 that outputs data to an on-chip data store 120. This data is then analysed by decompression program 31. Decompression program 31 uses data regarding the program being processed from program data store 130. CPU 30 also uses the program from program data store 130. It should be noted that decompression program 31 can be run on CPU 30 or on a different processor. Thus, in this embodiment the data processing apparatus can both run and debug the program. In the system of FIG. 3, the whole system is formed on a single chip; however, it can clearly be formed on separate chips as is illustrated, for example, in FIG. 2.

Figure 4A:
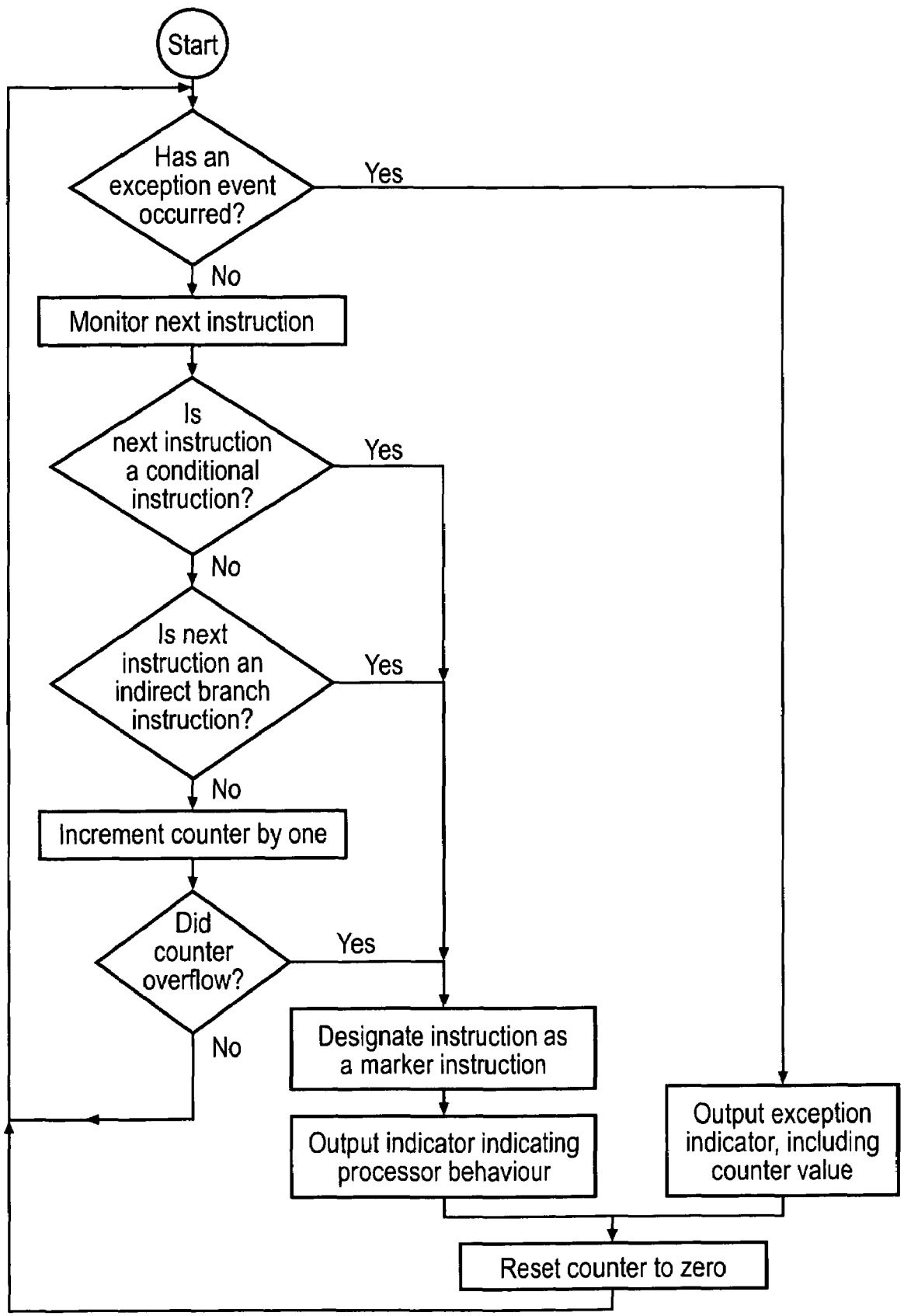
FIG. 4A shows a flow diagram illustrating the steps performed during tracing of a program according to an embodiment of the present invention.

FIG. 4A shows a flow diagram illustrating a method of tracing a program flow according to an embodiment of the present invention. The method comprises monitoring for an exception event or condition, if one is not detected the next instruction in the instruction stream is monitored to see if it is a conditional instruction or an indirect branch instruction. If it is then this instruction is designated as a marker instruction and an indicator indicating its behaviour is output, the counter is reset to zero, and we return to the top of the flow diagram. The indicator can take a number of forms. For example, with conditional instructions, it may comprise a bit taking the value 1 if the condition is true and the instruction is executed, and 0 if the condition is false and the instruction is not executed. For example, with indirect branch instructions, the indicator may comprise information as to where the program flow branches to. If the "next" instruction is neither a conditional instruction nor an indirect branch instruction then the counter is incremented by one. It will be appreciated that the counter is of a fixed size, and therefore at a maximum value incrementing the counter will cause it to overflow. If the counter overflows, then the instruction is designated as a marker instruction. In other words a normal instruction is promoted to be a marker instruction and information indicating the behaviour of the "marker" instruction is output and the counter is reset to zero. If the counter does not overflow then we return to the top of the flow diagram to detect if an exception event has occurred or not. Thus, the counter records the number of non-marker instructions which are processed between marker instructions.

If an exception is detected in the first step then the value of the counter is output along with information regarding the type of exception and/or where the exception has branched to. The counter is then reset to zero and we proceed to detecting the next instruction provided a further exception is not detected before this, which in this case will be an instruction that the program branches to in response to an exception, for example, it may be the first instruction within an interrupt service routine.

Figure 4B:
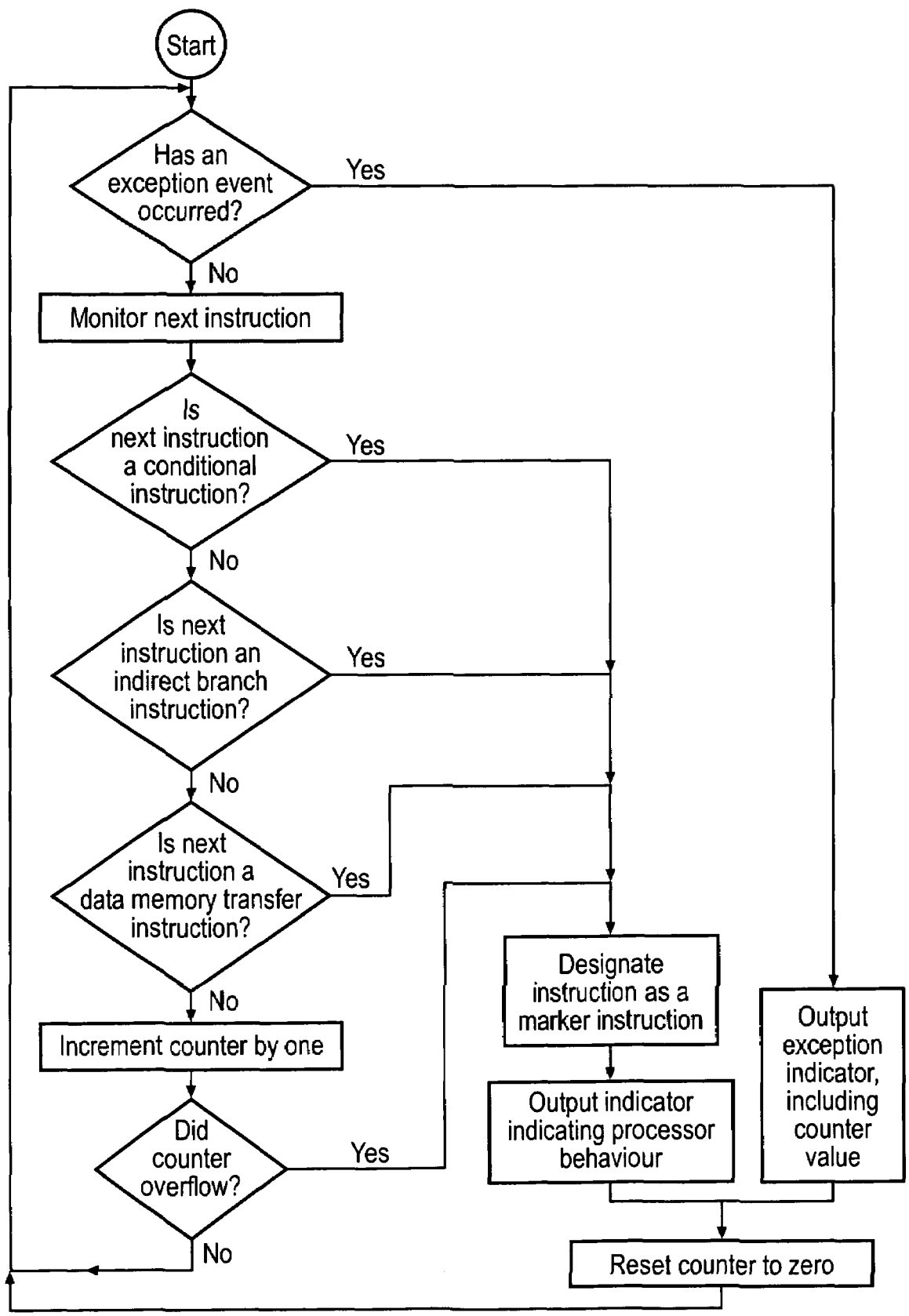
FIGS. 4B, 4C and 5 show flow diagrams illustrating the steps performed during tracing of a program according to alternative embodiments of the present invention.

FIG. 4B shows a flow diagram similar to that of FIG. 4A, but with an additional step. This embodiment includes the case where data memory transfer operations are also regarded as marker instructions. Thus, following determination of an instruction as a conditional instruction or indirect branch instruction, an additional step is performed to determine whether an instruction is a data memory transfer instruction, and to designate this as a marker. It will be appreciated that, after designating the instruction as a marker, the tracing logic outputs an indicator of the behavior of the instruction is output. In outputting the indicator, the tracing logic may make a further determination as to the nature of this indicator; for example if it determines the data memory transfer is to be traced, the indicator may comprise an indication of the transfer address and/or value; whereas if the transfer is not to be traced, the indicator may comprise a single bit indicating that the data memory transfer instruction was processed.

Figure 4C:
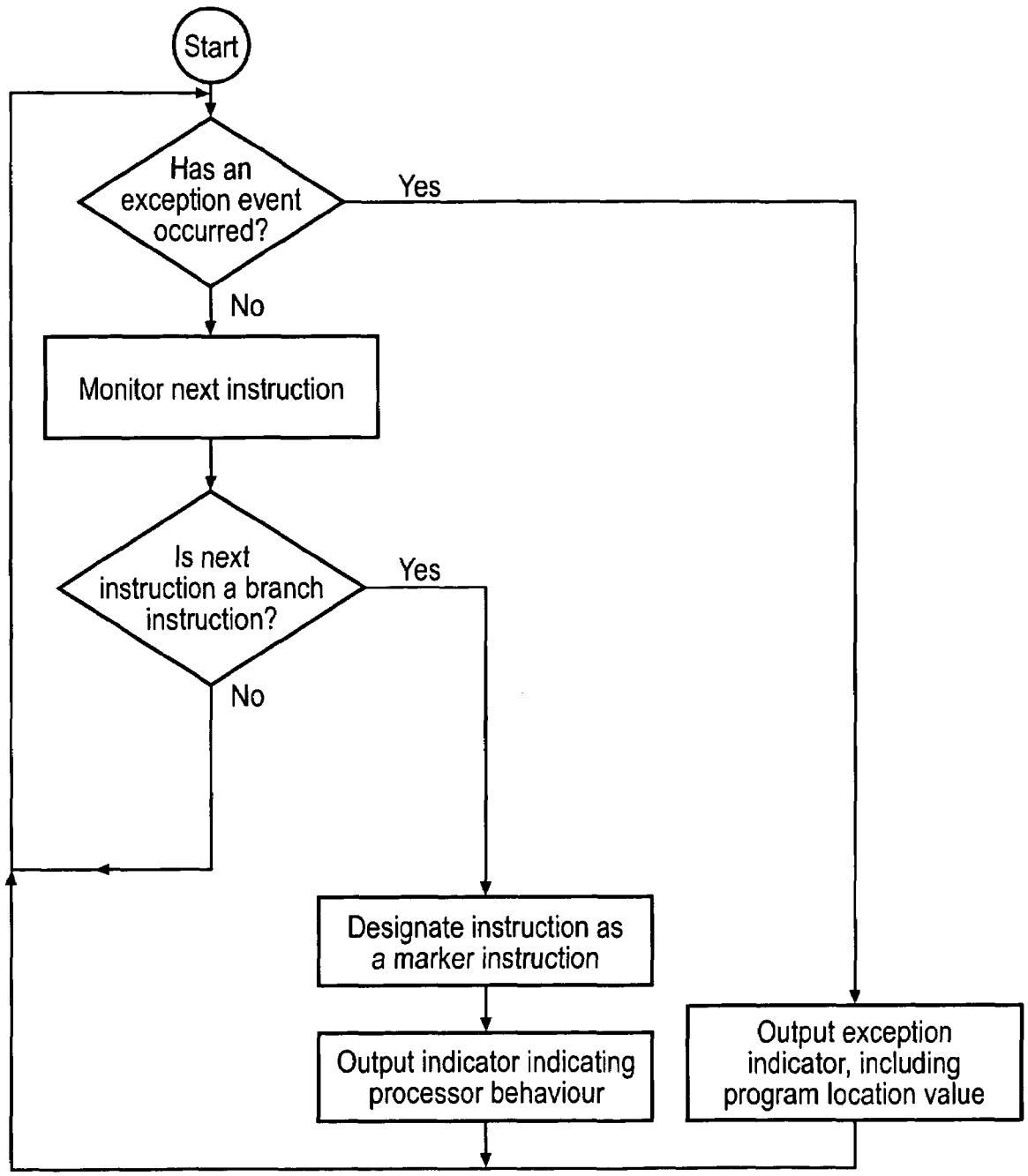

FIG. 4C shows a flow diagram similar to that of FIG. 4A, but for a different embodiment of the present invention. The method comprises monitoring for an exception event or condition, if one is not detected the next instruction in the instruction stream is monitored to see if it is a branch instruction. If it is then this instruction is designated as a marker instruction and an indicator indicating its behaviour is output, and we return to the top of the flow diagram. The indicator can take a number of forms. For example, with unconditional branch instructions it may comprise a bit taking the value 1 indicating the branch is processed. For example, with conditional branch instructions, it may comprise a bit taking the value 1 if the condition is true and the branch instruction is executed, and 0 if the condition is false and the branch instruction is not executed. For example, with indirect branch instructions, the indicator may comprise information as to where the program flow branches to. If the "next" instruction is not a branch instruction then we return to the top of the flow diagram to detect if an exception event has occurred or not.

If an exception is detected in the first step then the location in the program is output along with information regarding the type of exception and/or where the exception has branched to. It will be appreciated that the location indicator may take a number of forms, and may be output in a compressed form. For example, it may take the form of the address of the last instruction processed before the exception was taken. We proceed to detecting the next instruction provided a further exception is not detected before this, which in this case will be an instruction that the program branches to in response to an exception, for example, it may be the first instruction within an interrupt service routine.

Figure 5:
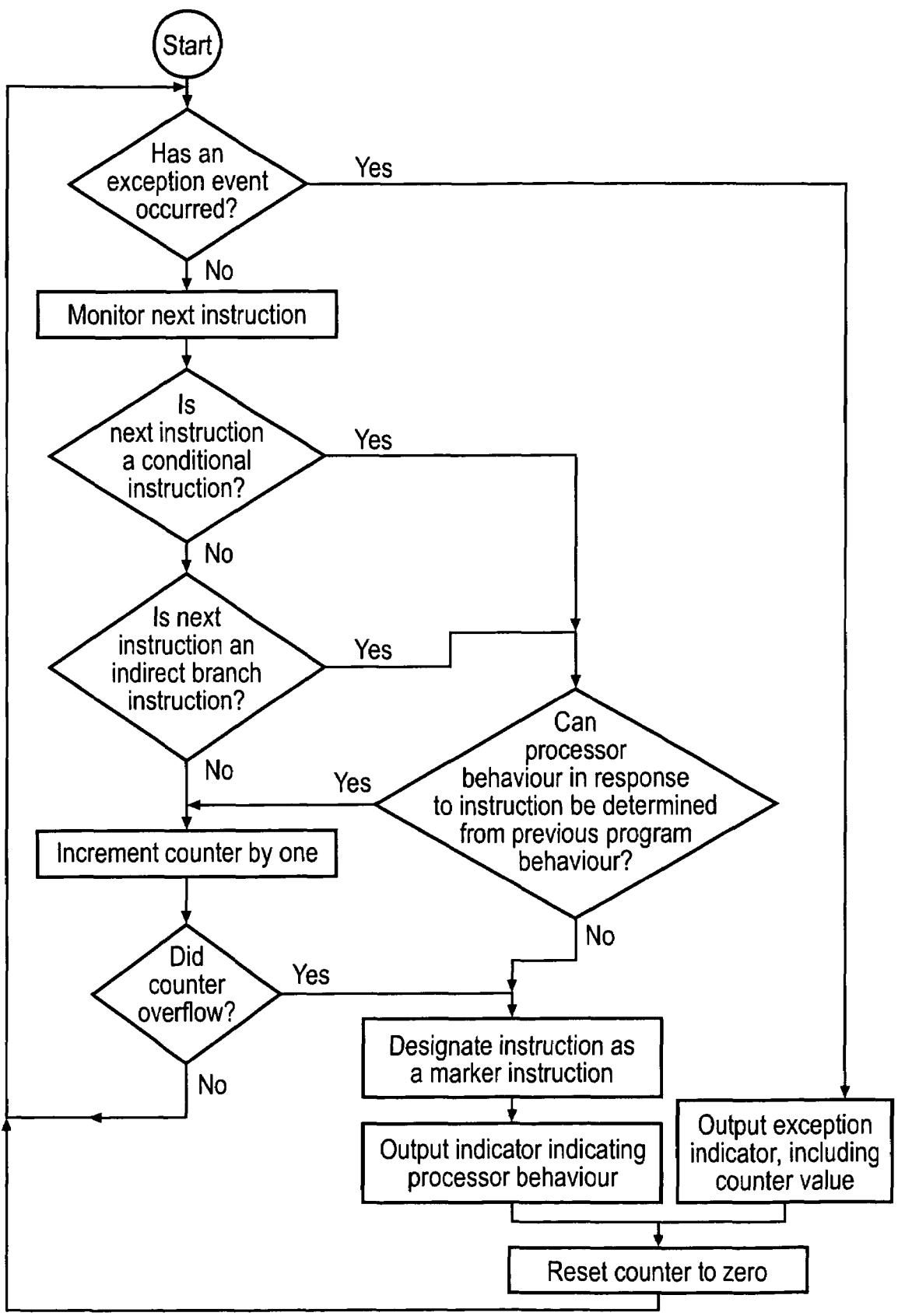

FIG. 5 shows a flow diagram similar to that of FIG. 4A, but with an additional step. This embodiment includes the possibility of not outputting indicators regarding instructions that can be dynamically determined as well as those that can be statically determined, i.e. those whose behaviour can be determined at the point that they are to be processed, from information regarding the behaviour of previously processed instructions that is contained in the trace stream. Thus, following determination of an instruction as a conditional instruction or indirect branch instruction, an additional step is performed whereby it is determined if the behaviour of the instruction can be determined from previous program behaviour. If the answer is no then the instruction is designated to be a marker instruction and the method proceeds as for FIG. 4A. If, however, it is yes, then the instruction is not immediately designated as a marker instruction and the method returns to the step of incrementing the counter value. However, the instruction may yet be designated as a marker instruction by way of the counter overflowing.

Figure 6:
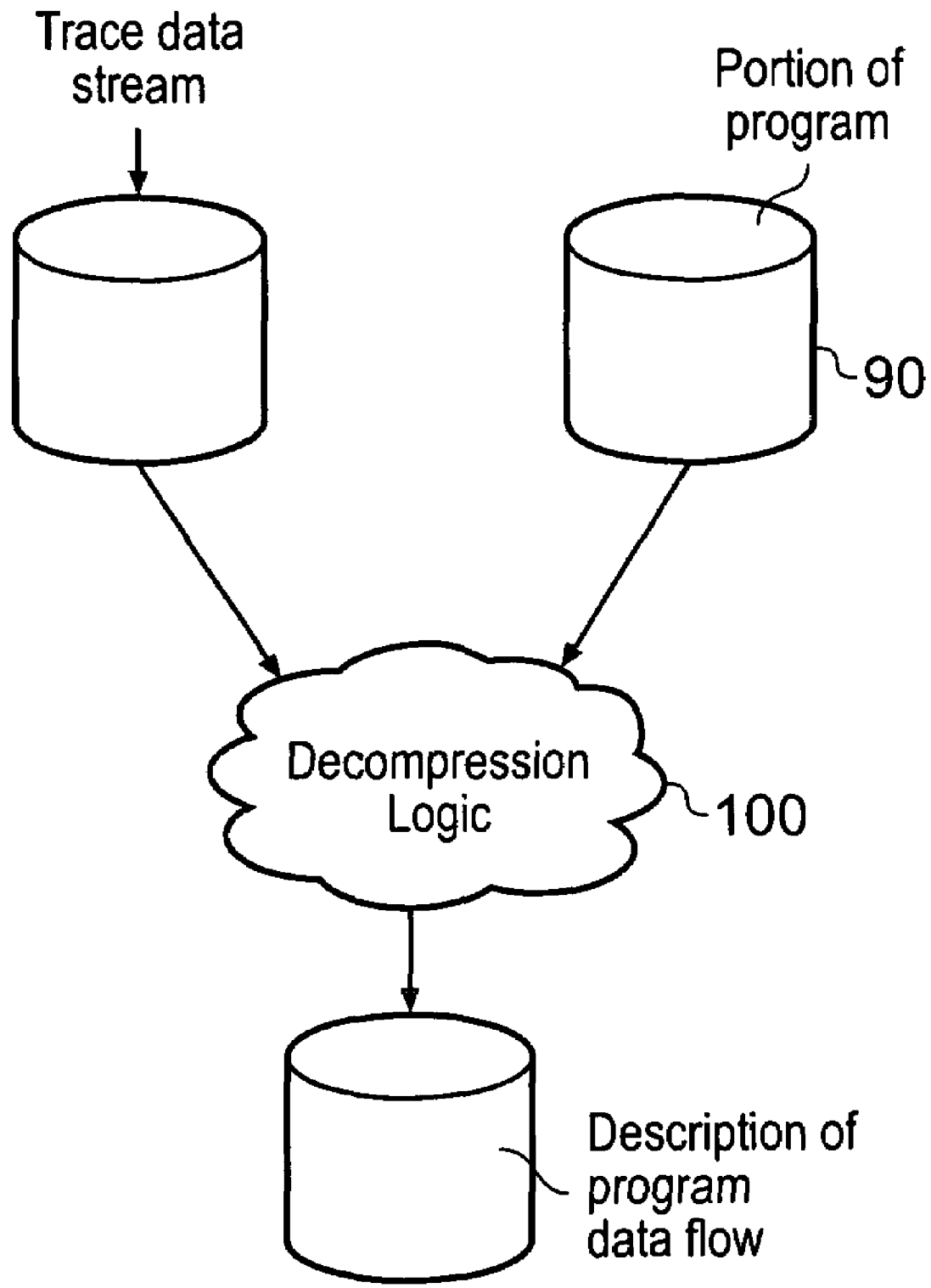
FIG. 6 shows a flow diagram illustrating the steps performed during analysis of the trace data produced in the method shown in FIG. 4A.

FIG. 6 shows a diagram illustrating schematically the steps performed during analysis of the trace data produced in the method shown in FIG. 4A. The data stream output at output port 65 of FIG. 2 is received from trace port adaptor 70 by decompression logic 100, which may be a program running on a diagnostic apparatus. The diagnostic apparatus also comprises a data store 90 which stores at least a part of the program being analysed. The decompression logic can derive a program data flow from the trace data and the stored program. In particular, it analyses the two together and if the program shows a conditional instruction or an indirect branch instructions it looks to the trace data stream to discover how they were processed. For other instructions it assumes they were executed, unless there is an indication of an exception event in the data stream. If that is the case, then it looks to the data stream to discover the number of instructions that were processed following the last conditional instruction or indirect branch instruction prior to this exception event. It then takes the information about the exception event and outputs this information along with the information about that number of instructions processed. Thus, the diagnostic apparatus can produce a step by step analysis of the behaviour of the processing apparatus processing the program from the stored program information and the data stream that provides information relating to indirect branch instructions and conditional instructions and the occurrence and position of exception events.

In addition to reducing the amount of data that the trace data stream has by not outputting information about statically determinable instructions, the data can be further reduced by the use of compression techniques. In order to find a suitable compression regime, typical patterns of data regarding execution, non-execution and exception events that are output by compression logic are analysed and the most common patterns are given particular encodings, which can then be used to reduce the number of bits required to output this data.

FIG. 7A shows an example of a stream of instructions being processed (column 3) and the resulting trace output according to an embodiment of the present invention. The instructions that are designated as marker instructions are shown, along with the count value and the final compressed output. The instructions from the ARM® instruction set architecture. Conditional instructions are indicated in the instruction assembly language by a condition code suffix to the instruction, such as EQ (equal; that is, the zero [Z] flag is one), NE (not equal; Z=0), CS (carry set; C=1) or HI (unsigned higher; C=1 and Z=0).

Column 1 shows a step sequence number indicating the order in which the instructions are processed. Column 2 shows program counter values for the instructions. Column 4 indicates whether each instruction processed is executed or not executed.

The function of the trace logic is to produce a trace stream from this sequence of operations containing sufficient information for a diagnostic apparatus to be able to reconstruct the sequence of operations.

In order to understand the output (column 8) of FIG. 7A, it is important to understand the compression technique that is used. A summary of possible compression schemes to compress the trace data of an embodiment of the present invention are given below along with a comparison of compression techniques for prior art trace data.

Existing Format (Prior-Art):

The trace stream consists of a series of bytes, with the following encodings.

TABLE 1

Existing trace byte formats

Bit:

| | 7 | 6 | 5 | 4 | 3 | 2 | 1 | 0 |
|---|---|---|---|---|---|---|---|---|
| PN | 1 | N | E[3] | E[2] | E[1] | E[0] | 0 | 0 |
| P2 | 1 | 0 | 0 | 0 | F1 | F2 | 1 | 0 |
| B1 | C | A[5] | A[4] | A[3] | A[2] | A[1] | A[0] | 1 |
| B2 | C | A[12] | A[11] | A[10] | A[9] | A[8] | A[7] | A[6] |
| B3 | C | A[19] | A[18] | A[17] | A[16] | A[15] | A[14] | A[13] |
| B4 | C | A[26] | A[25] | A[24] | A[23] | A[22] | A[21] | A[20] |
| B5A | 0 | C | 0 | 0 | 1 | A[29] | A[28] | A[27] |
| B5T | 0 | C | 0 | 1 | A[30] | A[29] | A[28] | A[27] |
| B5J | 0 | C | 1 | A[31] | A[30] | A[29] | A[28] | A[27] |
| B6 | 0 | TEE | CAN | X[3] | X[2] | X[1] | X[0] | NS |

Existing Format (Prior-Art): PN and P2:

To indicate a sequence of processed instructions, the trace logic outputs either a PN byte or a P2 byte.

The PN byte indicates up to 16 instructions processed, consisting of 0 to 15 instructions that executed, followed by up to 1 instruction that did not execute. Bits 7, 1 and 0 are used to discriminate a PN byte. The number of instructions that executed is encoded in the field E[3.0] and the number of instructions that did not execute is encoded in the N field:

TABLE 2

Encoding of E[3 . . . 0] bits in PN format byte

| Bits | Value | # of instrs executed |
|---|---|---|
| E[3 . . . 0] | 0000 | 0 |
| | 0001 | 1 |
| | 0010 | 2 |
| | 0011 | 3 |
| | 0100 | 4 |
| | 0101 | 5 |
| | 0110 | 6 |
| | 0111 | 7 |
| E[3 . . . 0] | 1000 | 8 |
| | 1001 | 9 |
| | 1010 | 10 |
| | 1011 | 11 |
| | 1100 | 12 |
| | 1101 | 13 |
| | 1110 | 14 |
| | 1111 | 15 |

TABLE 3

Encoding of N bit in PN format byte

| Bits | Value | # of instrs not executed |
|---|---|---|
| N | 0 | 0 |
| | 1 | 1 |

The P2 byte indicates 2 instructions were processed, consisting of any mix of executed and non-executed:

TABLE 4

Encoding of F1 and F2 bits of P2 format byte

| F1 | F2 | First instruction | Second instruction |
|---|---|---|---|
| 0 | 0 | Executed | Executed |
| 0 | 1 | Executed | Not executed |
| 1 | 0 | Not executed | Executed |
| 1 | 1 | Not executed | Not executed |

Bits 7 through 4, 1 and 0 are used to discriminate a P2 byte.

The trace logic tracks instructions being processed and only outputs a P2 or PN byte when a further instruction that was processed cannot be encoded in the current byte, or on encountering an indirect branch instruction being executed, or on an exception.

For example, if a sequence of 5 instructions have been processed, all of which were executed, the current byte, if output, would be a PN byte with E[3.0]=0101 and N=0. If the next instruction that is processed is executed, the trace logic does not output this byte and instead moves on to an encoding of PN with E[3.0]=0110 and N=0. However, if the next instruction processed is not executed, the trace logic will output the PN byte with E[3.0]=0110 and N=1 (indicating a sequence of 6 instructions executed, followed by one not executed), since it is impossible to encode further instructions in that PN byte. That is, the byte 8'b11011000 is output.

Possible Compression Format Suitable for Compressing Trace Data According to an Embodiment of the Present Invention: PN, P2, P3 and P4:

The prior art encoding favours long runs of executed instructions and few non-executed. Under a particular embodiment of the present invention, only executed-conditional instructions and not-executed instructions (which are by definition conditional) are encoded in the PN and P2 formats, with E[3.0] in the PN byte encoding the number of marker instructions processed that were executed-conditional. The encoding of the N bit is unchanged.

TABLE 5

Encoding of E[3 . . . 0] bits in modified PN format byte

| Bits | Value | # of instrs executed-conditional |
|---|---|---|
| E[3 . . . 0] | 0000 | 0 |
| | 0001 | 1 |
| | 0010 | 2 |
| | 0011 | 3 |

TABLE 5-continued

Encoding of E[3 . . . 0] bits in modified PN format byte

| Bits | Value | # of instrs executed-conditional |
|---|---|---|
| E[3 . . . 0] | 0100 | 4 |
| | 0101 | 5 |
| | 0110 | 6 |
| | 0111 | 7 |
| | 1000 | 8 |
| | 1001 | 9 |
| | 1010 | 10 |
| | 1011 | 11 |
| | 1100 | 12 |
| | 1101 | 13 |
| | 1110 | 14 |
| | 1111 | 15 |

Similarly, the definition of the P2 byte is modified:

TABLE 6

Encoding of F1, F2 bits in modified P2 format byte

| F1 | F2 | First instruction | Second instruction |
|---|---|---|---|
| 0 | 0 | Executed-conditional | Executed-conditional |
| 0 | 1 | Executed-conditional | Not executed (conditional) |
| 1 | 0 | Not executed (conditional) | Executed-conditional |
| 1 | 1 | Not executed (conditional) | Not executed (conditional) |

Because runs of executed-conditional instructions are less common than runs of executed (conditional or unconditional) instructions, new formats are introduced that indicate 3 and 4 marker instructions processed, consisting of any combination of executed-conditional and not executed (conditional) marker instructions.

TABLE 7

New format P3 and P4 bytes

| | Bit: | | | | | | |
|---|---|---|---|---|---|---|---|
| | 7 | 6 | 5 | 4 | 3 | 2 | 1 | 0 |
| P3 | 1 | 0 | 1 | F1 | F2 | F3 | 1 | 0 |
| P4 | 1 | 1 | F1 | F2 | F3 | F4 | 1 | 0 |

The F1 and F2 bit encodings are as in the P2 format byte. The F3 and, in the case of the P4 byte, F4 encodings are as follows:

TABLE 8

Encoding of F3 and F4 bits in new P3 and P4 format byte

| F3 | F4 (P4 format only) | Third instruction | Fourth instruction (P4 format only) |
|---|---|---|---|
| 0 | 0 | Executed-conditional | Executed-conditional |
| 0 | 1 | Executed-conditional | Not executed (conditional) |
| 1 | 0 | Not executed (conditional) | Executed-conditional |
| 1 | 1 | Not executed (conditional) | Not executed (conditional) |

Existing Format: B Packets:

On encountering an indirect branch instruction that executed, the trace logic first ensures that preceding instructions and the indirect branch are traced (by outputting the PN or P2 bytes that encode them), and then outputs a B packet. A B packet consists of the B1 byte optionally followed by the B2 byte, optionally followed by the B3 byte and so on. The 'C' bit in each B byte indicates that a further byte follows; C=0 indicating this is the terminating byte, C=1 indicating the next byte follows.

The A[ ] bits of the B packet encode the changed bits of the program counter (PC) on the branch. For example, if an indirect branch at address 0x8013 (16'b1000000000010011), branches to address 0x801F (16'b1000000000011111), only the bottom 4 bits of the PC change, so the B packet is encoded as a single B1 byte containing the new values. This byte also necessarily includes the unchanged bits 5 and 4 of the PC. That is, the single byte 8'b00111110 is output.

The ARM® processor implements more than one instruction set, with some implementations having four possible instruction sets, known as the ARM instruction set, the Thumb instruction set, the Thumb-2EE instruction set, and the Java instruction set.

Since all instructions in the ARM instruction set (processed in ARM state) are 32 bits and are aligned on addresses that are a multiple of 4, every PC address has bits 1 and 0 set to 0. Therefore before a branch packet is calculated, the source and destination addresses are shifted right 2 binary places. That is, B1 bit A[0] corresponds to PC bit 2, bit A[1] to PC bit 3 and so on.

Similarly, in the Thumb instruction set (processed in Thumb state), and Thumb-2EE instruction set (processed in ThumbEE state) instructions are 16 bits, aligned on multiples of 2, and so the addresses are shifted right 1 binary place. That is, B1 bit A[0] corresponds to PC bit 1, bit A[1] to PC bit 2 and so on.

In the Java instruction set (processed in Jazelle state), instructions are 8 bits and can be at any address, and so no address shifting occurs. That is, B1 bit A[0] corresponds to PC bit 0, bit A[1] to PC bit 1 and so on.

Therefore in a 32-bit address space, an ARM address requires at most 30 bits, a Thumb or Thumb-2EE address at most 31 bits and a Java address 32 bits. If a full 5-byte B packet is used, the fifth byte is one of the three formats B5A, B5T or B5J, indicating the target address is one of an ARM instruction address, a Thumb or Thumb-2EE instruction address or a Java instruction address.

On changing instruction sets, the full 5 byte packet is always generated, so that the target instruction set is indicated. The C bit in the $5^{th}$ byte is not normally set on an indirect branch. It is used to indicate an exception or a branch to or from the ThumbEE state.

On an exception, a B packet is also generated, which will always contain 5 bytes. However, in the 5$^{th}$ byte, the continuation bit (C) will be set indicating a 6$^{th}$ byte, of the format B6. This encodes the type of exception, whether the exception cancelled the most recent instruction, whether the instruction was processed as a secure exception.

The 6$^{th}$ byte is also generated following a B5T byte on an indirect branch into or out of the ThumbEE state, and this is also encoded, with the exception type field indicating no exception.

TABLE 9

Encoding of B6 byte

| Bit(s) | Value | Meaning |
|---|---|---|
| TEE | 0 | Target of branch is not ThumbEE state |
|  | 1 | Target of branch is ThumbEE state |
| CAN | 0 | Previous instruction not cancelled |
|  | 1 | Previous instruction cancelled |
| X[3 . . . 0] | 0000 | No exception |
|  | 0001 | Debug exception |
|  | 0010 | Secure Monitor Call exception |

TABLE 9-continued

Encoding of B6 byte

| Bit(s) | Value | Meaning |
|---|---|---|
|  | 0011 | Reserved |
|  | 0100 | Imprecise data abort exception |
|  | 0101 | Jazelle exception |
|  | 0110 | Reserved |
|  | 0111 | Reserved |
|  | 1000 | Reset exception |
|  | 1001 | Undefined Instruction exception |
|  | 1010 | Supervisor Call exception |
|  | 1011 | Prefetch abort exception |
|  | 1100 | Data abort exception |
|  | 1101 | Reserved |
|  | 1110 | Interrupt exception |
|  | 1111 | Fast interrupt exception |
| NS | 0 | Exception processed in secure state |
|  | 1 | Exception processed in non-secure state |

Therefore on an indirect branch, the sequence of bytes generated is always one of:

TABLE 10

| | Sequence of bytes on indirect branches | | | | | | |
|---|---|---|---|---|---|---|---|
| | 0 | 1 | 2 | 3 | 4 | 5 | 6 |
| Branch (not changing state) | PN or P2 | B1 (C=0) | | | | | |
| | PN or P2 | B1 (C=1) | B2 (C=0) | | | | |
| | PN or P2 | B1 (C=1) | B2 (C=1) | B3 (C=0) | | | |
| | PN or P2 | B1 (C=1) | B2 (C=1) | B3 (C=1) | B4 (C=0) | | |
| Branch to ARM state | PN or P2 | B1 (C=1) | B2 (C=1) | B3 (C=1) | B4 (C=1) | B5A (C=0) | |
| Branch to Thumb state | PN or P2 | B1 (C=1) | B2 (C=1) | B3 (C=1) | B4 (C=1) | B5T (C=0) | |
| (or, from ThumbEE state) | PN or P2 | B1 (C=1) | B2 (C=1) | B3 (C=1) | B4 (C=1) | B5T (C=1) | B6 (TEE=0, X[3:0]=0) |
| Branch to Jazelle state | PN or P2 | B1 (C=1) | B2 (C=1) | B3 (C=1) | B4 (C=1) | B5J (C=0) | |
| Branch to ThumbEE state | PN or P2 | B1 (C=1) | B2 (C=1) | B3 (C=1) | B4 (C=1) | B5T (C=1) | B6 (TEE=1, X[3:0]=0) |

(Note that the PN or P2 byte encodes the instructions prior to, and including, the branch.)

On an exception, a sequence of bytes is generated:

| 0 | 1 | 2 | 3 | 4 | 5 | 6 |
|---|---|---|---|---|---|---|
| Exception | PN or P2 | B1 (C = 1) | B2 (C = 1) | B3 (C = 1) | B4 (C = 1) | B5A or B5T or B5J (C = 1) | B6 (X[3:0] ≠ 0) |

The type of byte 5, and the TEE bit in byte 6 indicate the state the exception is handled in.

New Format, According to an Embodiment of the Present Invention: B7 Byte:

To extend the protocol to encode the count of non-marker instructions processed since the last marker instruction, a further byte is output following the B6 byte, referred to as a B7 byte. To indicate the presence of this byte, a continuation bit is also added to the B6 byte.

In one embodiment of the present invention, this B7 byte contains a counter value.

TABLE 11

New format B7 byte - exception counter embodiment

| | Bit: | | | | | | | |
|---|---|---|---|---|---|---|---|---|
| | 7 | 6 | 5 | 4 | 3 | 2 | 1 | 0 |
| B6 (modified) | C | TEE | CAN | X[3] | X[2] | X[1] | X[0] | NS |
| B7 | 0 | 0 | 0 | I[4] | I[3] | I[2] | I[1] | I[0] |

Bits I[4.0] encode a 5-bit counter, which experimentation has shown to be a reasonable length to use. Therefore on an exception, the trace logic outputs:

| 0 | 1 | 2 | 3 | 4 | 5 | 6 | 7 |
|---|---|---|---|---|---|---|---|
| Exception (new format) | PN, P2, P3 or P4 | B1 (C = 1) | B2 (C = 1) | B3 (C = 1) | B4 (C = 1) | B5A or B5T or B5J (C = 1) | B6 (C = 1, X[3...0] ≠ 0) | B7 |

New Format, According to an Embodiment of the Present Invention: B7 to B11 Bytes:

In a different embodiment of the present invention, a value indicative of the location in the program where the exception occurred is output on detection of the exception. In the preferred embodiment, this is output as a series of bytes following the B6 bytes which encode the address of the instruction which was subject to the exception. This is compressed by encoding the value as the bit-wise difference between the address of the last marker instruction (which will be known to the decompressor) and the address of the instruction at the exception point, in the same manner as branch bytes B1 to B4, using a continuation bit in each byte. The final byte, B11, if required can contain up to the $32^{nd}$ bit of the address, although it will be appreciated that if the exception occurred in the ARM, Thumb or Thumb-2EE instruction sets, not all of these bits will be required and the extra bits will therefore be zero.

TABLE 12

New format B7-B11 bytes - exception address embodiment

| | Bit: | | | | | | | |
|---|---|---|---|---|---|---|---|---|
| | 7 | 6 | 5 | 4 | 3 | 2 | 1 | 0 |
| B6 (modified) | C | TEE | CAN | X[3] | X[2] | X[1] | X[0] | NS |
| B7 | C | XA[5] | XA[4] | XA[3] | XA[2] | XA[1] | XA[0] | 1 |
| B8 | C | XA[12] | XA[11] | XA[10] | XA[9] | XA[8] | XA[7] | XA[6] |
| B9 | C | XA[19] | XA[18] | XA[17] | XA[16] | XA[15] | XA[14] | XA[13] |
| B10 | C | XA[26] | XA[25] | XA[24] | XA[23] | XA[22] | XA[21] | XA[20] |
| B11 | 0 | 0 | 0 | XA[31] | XA[30] | XA[29] | XA[28] | XA[27] |

Therefore on an exception, the trace logic outputs, for example where only 3 bytes are required to indicate this instruction address:

|  | 0 | 1 | 2 | 3 | 4 | 5 | 6 | 7 | 8 | 9 |
|---|---|---|---|---|---|---|---|---|---|---|
| Exception (new format) | PN, P2, P3 or P4 | B1 (C = 1) | B2 (C = 1) | B3 (C = 1) | B4 (C = 1) | B5A or B5T or B5J (C = 1) | B6 (C = 1, X[3...0] ≠ 0) | B7 (C = 1) | B8 (C = 1) | B9 (C = 0) |

However, this embodiment is not that shown in FIG. 5.

In the new formats, the PN/P2 or P4 byte preceding any B packet sequence (whether an exception or not) does not encode the branch instruction itself, as this is implicit by the presence of the B packet.

Column 5 of FIG. 7 indicates whether each instruction is an indirect branch instruction or a conditional instruction; that is, in this embodiment, a marker instruction. Where an instruction is a marker instruction, the reason is given—with "(cc)" indicating the instruction is designated a marker instruction on account of being a conditional instruction, and "(ib)" indicating the instruction is designated a marker instruction on account of being an indirect branch instruction. An instruction may also be promoted to be a marker instruction on overflow of the counter used for exception processing. However, in this example no such overflow occurs.

Column 6 indicates the atoms produced for marker instructions.

Column 7 indicates the value of the counter used for exception processing in this embodiment of the present invention. This counter increments on each non-marker instruction processed.

Column 8 indicates the output of this embodiment of the present invention, with the type of byte produced indicated, and the values in the various fields of that atom shown.

Instruction processing in the example shown in FIG. 7 starts at step 1, with the processing of a SUB instruction. This instruction is not conditional, and is therefore executed, and, not being an indirect branch instruction, is treated by the ETM as a non-marker instruction, indicated in Column 5. Therefore the counter is incremented to 1, as shown in Column 7.

The instruction at step 2 is similarly not a marker instruction, and the counter increments to 2.

The instruction at step 3 is BEQ. This is a conditional branch instruction, and therefore is treated as a marker instruction by the ETM. The ETM generates an N atom for this instruction as it is not executed, and resets the counter to 0. The stream of atoms is being further compressed by the ETM so this atom is not output at this step.

Processing continues in this manner to step 10. Two further marker instructions are encountered, each generating an N atom, and at each step the counter is reset. At step 10, a fourth marker instruction is processed, which also generates an N atom. At this step the ETM can not further compress the atom stream, and has to output a P4 byte, encoding the four N-atoms.

Processing further continues to step 17, where, due to the execution of a conditional branch instruction, BHI, the program counter loops back to the instruction at 0x8050. Processing then continues to step 18. Up to step 18, the sequence of atoms generated are all E-atoms, but the instruction at step 19 is not executed and therefore the ETM must now output a PN byte, encoding the run of 4 E-atoms and the single N-atom.

Processing further continues to step 26, where the processor receives an interrupt exception (referred to in the ARM® architecture as an IRQ). Up to this step the ETM has recorded three N-atoms, the most recent at step 24. Since that step, 1 non-marker instruction has been processed, so the counter stands at 1. Therefore the ETM first outputs a P3 byte to encode the series of 3 N-atoms, followed by a 7-byte branch packet, encoding the branch the IRQ exception handler at 0x18, the occurrence of the IRQ exception, and the current value of the counter (1). The counter is reset at this step.

The instruction at the IRQ exception handler is processed at step 27. This instruction, LDR pc,[pc,#20], is an example of an indirect branch instruction, and hence is a marker instruction. In response to this marker instruction the ETM generates a further branch packet encoding the destination of the indirect branch, in this case the address 0x1000. The instruction at 0x1000 is processed at step 28.

By way of illustration, FIG. 7B shows the trace output generated by a conventional ETM and XScale in response to the same set of instructions as that shown in FIG. 7A. As can be seen the embodiment of the present invention reduces the trace data output when compared to a conventional ETM. The XScale trace comprises roll-over, direct branch, exception and indirect branch bytes. However, XScale itself produces less output data than this embodiment. However, it should be noted that XScale may not output sufficient data to allow the steps of the processor to be accurately traced as information relating to conditional instructions that are not branch instructions is not output. XScale also does not output information regarding the address branched to on an exception, as the address branched to is fixed for the exception type for the XScale processor. In addition, the sequence of instructions is relatively short and therefore the amount of trace produced is not representative of a long instruction stream.

As can be seen from FIG. 7B, the prior art ETM method produced a trace having far more E-atoms (indicating executed instructions) than N-atoms (those not executed). Such data patterns are relatively easy to compress using well known compression techniques, such as the run-length coding scheme used in the PN encoding described above. Embodiments of the present invention however, tend to form data patterns having fairly equal numbers of E and N-atoms and as such are more difficult to compress.

An alternative to finding a compression technique that can effectively deal with data that has a fairly equal number of two outputs would be to find some way of adjusting the information output so that nearly all of one value is given. This can be done if a prediction technique is used to predict how an instruction will cause the processor to behave. If the prediction technique is good at making these predictions then the trace output will consist mostly of "prediction correct" indicators with only a few "prediction incorrect" indicators. Provided the diagnostic apparatus was able to make the same predictions then such a trace data stream could be used to trace the behaviour of a processor.

Although in the embodiments shown above it is just conditional instructions and unconditional indirect branch instructions that are designated as marker instructions, it should be noted that embodiments of the invention are not limited to this.

It may be that in some circumstances it is important to output data concerning other classes of processed instructions in addition to conditional instructions and unconditional indirect branch instructions. Thus, in some embodiments the monitoring logic may detect a further specified class of instruction, and the compression logic may designate this further specified class of instructions as marker instructions. Furthermore, in other embodiments only conditional direct branch instructions, conditional indirect branch instructions and indirect branch instructions may be designated as marker instructions.

For example, when the memory addresses and data values of some data accesses initiated by load and store instructions are also being traced, it is important to know when these load and store instructions are processed, as not all such memory addresses and data values will necessarily be traced. By designating load and store instructions as marker instructions, the trace stream will always contain minimal information as to the behavior of these instructions, that is, whether they executed or not, so that those which are traced can later be correctly identified.

In such cases the tracing logic detects the specified class of instructions in the instruction stream so that it can designate them as marker instruction and output an indicator indicating their behaviour. It should be noted that it is generally the ETM itself which specifies any additional class of instruction to be designated as marker instructions. It does this in dependence upon what it has been asked to trace.

Figure 8:
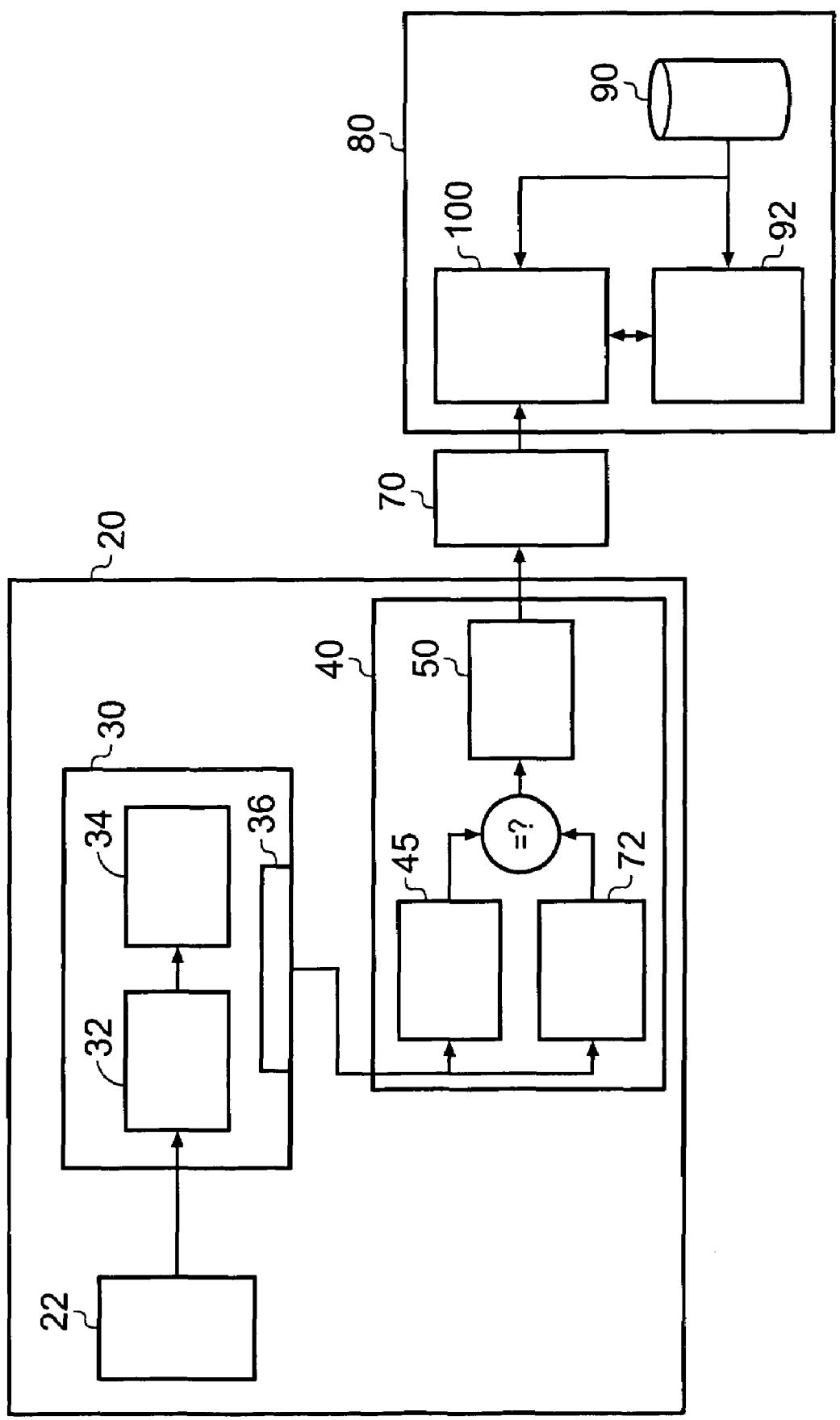
FIG. 8 shows a system comprising a data processing apparatus and a diagnostic apparatus both having prediction logic according to an embodiment of the present invention.

FIG. 8 shows a data processing apparatus corresponding to that of FIG. 2, but further comprising prediction logic 72 for predicting the behaviour of the processor 30. The predictions made by prediction logic 72 are compared to the actual behaviour of the CPU 30 monitored by monitoring logic 45 and if they are correct a "prediction correct" indicator is output to compression logic 50, whereas if they are not a "prediction incorrect" indicator is output to compression logic 50. Additional indication of the actual behavior of the processing apparatus may also be output at this stage if appropriate. If the prediction system is generally correct then mostly "prediction correct" indicators are output, and thus will compress to less data than the original trace stream.

For example, the predictions made by prediction logic 72 can be as to whether the condition of a conditional instruction is true or false. If the value of the condition matches the prediction made by prediction logic 72 a 1 (a "prediction correct" indicator) is output to compression logic 50, whereas if the condition does not match the prediction made by prediction logic 72, a 0 (a "prediction incorrect" indicator) is output to compression logic 50. An additional indicator of the actual behavior is not required in this case as there are only two possible behaviors.

An example prediction scheme is as follows:
1. When a conditional instruction follows an unconditional instruction, predict it is executed.
2. When a second conditional instruction follows a first conditional instruction:

a. if the second instruction's condition is the same as the first instruction's condition, then predict that the execution status of the second instruction will be the same as the actual execution status of the first instruction; whereas b. if the second instruction's condition is different from the first instruction's condition, then predict that the execution status of the second instruction will be the opposite of the actual execution status of the first instruction.

Diagnostic apparatus 80 further comprises prediction logic 92 arranged to make identical predictions of the behavior of the processor. It is able to make identical predictions as it has access to the sequence of instructions processed by the CPU from the decompression logic 100. Decompression logic 100 receives the prediction from prediction logic 92 and, using the indicators in trace stream received from trace port adaptor 70, reconstructs the actual CPU behavior.

Figure 9:
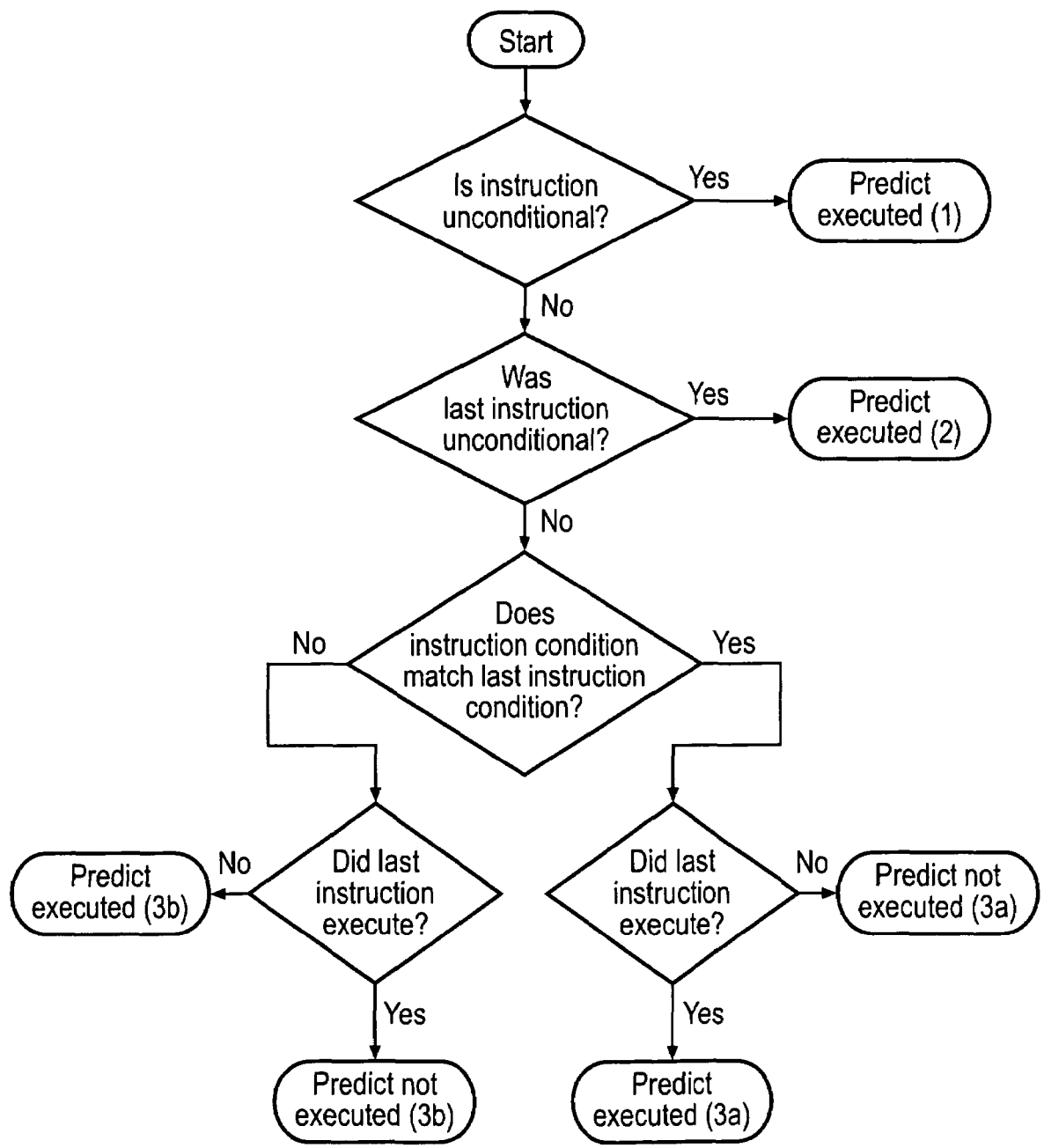
FIG. 9 shows a flow diagram giving an example prediction scheme.

FIG. 9 shows a flow diagram illustrating a prediction scheme following the prediction rules set out above. In this prediction scheme an instruction is considered and if it is unconditional an "executed" prediction is made in accordance with rule 1. If it is not unconditional, the previous instruction is considered to see if it was unconditional if it was, then an "executed" prediction is made (rule 2). If it was not, the instruction condition is considered to see if it matches the previous instruction condition, if it does, then if the previous instruction executed "executed" is predicted, whereas if it did not execute "not executed" is predicted in accordance with rule 3a. If the instruction condition did not match the previous instruction condition, then if the previous instruction executed "not executed" is predicted whereas if it did not execute, "executed" is predicted (rule 3b).

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. Tracing logic circuitry for monitoring a stream of processing instructions from a program being processed by a data processor, said tracing logic circuitry comprising monitoring logic operable to:

detect processing of said instructions in said instruction stream;

detect which of said instructions in said instruction stream are conditional direct branch instructions, which of said instructions in said instruction stream are conditional indirect branch instructions and which of said instructions in said instruction stream are unconditional indirect branch instructions;

said tracing logic circuitry further comprising compression logic operable to:

designate said conditional branch instructions, said conditional indirect branch and said unconditional indirect branch instructions as marker instructions; and for each marker instruction, output an indicator indicating a behaviour of said data processor when said marker instruction is processed and not output data relating to processed instructions that are not marker instructions, wherein said compression logic is operable prior to outputting said indicators, to compress the indicator data and to output said compressed data.

2. Tracing logic circuitry according to claim 1, wherein said monitoring logic is further operable to detect which of said instruction stream are conditional instructions; and said compression logic is further operable to designate said conditional instructions as marker instructions.

3. Tracing logic circuitry according to claim 1, wherein said monitoring logic is further operable to detect which of said instruction stream are data memory transfer instructions; and said compression logic is further operable to designate said data memory transfer instructions as marker instructions.

4. Tracing logic circuitry according to claim 1, said compression logic being operable in response to detection of said indirect branch instructions being processed, to output an indication of where said instruction has branched to as said indicator.

5. Tracing logic circuitry for monitoring a stream of processing instructions from a program being processed by a data processor, said tracing logic circuitry comprising monitoring logic operable to:
  detect processing of said instructions in said instruction stream;
  detect which of said instructions in said instruction stream are conditional direct branch instructions, which of said instructions in said instruction stream are conditional indirect branch instructions and which of said instructions in said instruction stream are unconditional indirect branch instructions;
  said tracing logic circuitry further comprising compression logic operable to:
    designate said conditional branch instructions, said conditional indirect branch and said unconditional indirect branch instructions as marker instructions; and
    for each marker instruction, output an indicator indicating a behaviour of said data processor when said marker instruction is processed and not output data relating to processed instructions that are not marker instructions, wherein said monitoring logic further comprises a counter, and is further operable to:
  count a number of non-marker instructions that are processed following each marker instruction using said counter; and
  detect an exception event; and
  said compression logic is operable in response to detection of said exception event to output an exception indicator indicating taking of said exception along with said counter value.

6. Tracing logic circuitry according to claim 5, wherein said compression logic is operable in response to said counter value exceeding a predetermined value, to designate said non-marker instruction reached at a point said counter value exceeds said predetermined value as a marker instruction irrespective of the nature of said non-marker instruction, and to reset said counter.

7. Tracing logic circuitry according to claim 1, wherein said monitoring logic is further operable to detect which of said instruction stream are unconditional direct branch instructions; and said compression logic is further operable to designate said unconditional direct branch instructions as marker instructions.

8. Tracing logic circuitry according to claim 1, wherein said monitoring logic is further operable to:
  detect an exception event; and
  said compression logic is operable in response to detection of said exception event to output an exception indicator indicating taking of said exception along with a value indicative of the location in said program where said exception occurred.

9. Tracing logic circuitry for monitoring a stream of processing instructions from a program being processed by a data processor, said tracing logic circuitry comprising monitoring logic operable to:
  detect processing of said instructions in said instruction stream;
  detect which of said instructions in said instruction stream are conditional direct branch instructions, which of said instructions in said instruction stream are conditional indirect branch instructions and which of said instructions in said instruction stream are unconditional indirect branch instructions;
  said tracing logic circuitry further comprising compression logic operable to:
    designate said conditional branch instructions, said conditional indirect branch and said unconditional indirect branch instructions as marker instructions; and
    for each marker instruction, output an indicator indicating a behaviour of said data processor when said marker instruction is processed and not output data relating to processed instructions that are not marker instructions, said tracing logic circuitry being further operable to determine if a behavior of at least one of said marker instructions can be determined from a behavior of previous marker instructions, said tracing logic circuitry being operable to demote said at least one marker instruction to an instruction that is not a marker instruction.

10. A data processing apparatus comprising a data processor operable to process said stream of program instructions and tracing logic circuitry according to claim 1.

11. A data processing apparatus according to claim 10, said data processing apparatus further comprising:
  prediction logic operable to provide at least one prediction of a processing behaviour of at least one of said marker instructions; and wherein said monitoring logic is operable to
    determine from said monitored behaviour whether or not said at least one prediction is correct; and
    for said at least one marker instruction output as said indicator an indication as to whether or not said at least one prediction is correct.

12. A data processing apparatus according to claim 11, wherein said prediction logic is operable to provide a prediction for at least one conditional instruction, said prediction logic being operable to predict whether the condition of said conditional instruction will be true or false, said indicator for said at least one conditional instruction comprising a prediction correct indication if said prediction is correct and prediction incorrect indication if said prediction is incorrect.

13. A data processing apparatus according to claim 11, wherein said prediction logic is operable to provide a plurality of predictions as to a corresponding plurality of steps of said behaviour of said portion of said data processing apparatus, said tracing logic circuitry being operable to determine whether or not at least some of said plurality of predictions are correct and to produce a corresponding at least some of said plurality of prediction indicators said compression logic being operable to compress said at least some of said plurality of prediction indicators to produce compressed data and said tracing logic circuitry is operable to output said compressed data.

14. A data processing apparatus according to claim 10, wherein said tracing logic circuitry comprises an embedded trace macrocell.

15. A data processing apparatus according to claim 10, said data processing apparatus further comprising a data store, and wherein said compression logic is operable to output data to said data store.

16. A diagnostic apparatus operable to receive a data stream output from tracing logic monitoring a data processor, said data stream comprising indicators indicating a behavior of said data processor when marker instructions are processed and not comprising data relating to processed instructions that are not marker instructions, said marker instructions comprising conditional direct branch instructions, conditional indirect branch instructions and unconditional indirect branch instructions, said diagnostic apparatus comprising decompression logic and a data store, said data store being operable to store said instructions of said program being processed by said data processor, said decompression logic being operable to receive said data stream and to determine a program flow from said indicators of said marker instructions and said stored program, wherein said data stream further comprises exception event indicators and counter values, said counter values indicating a number of instructions processed following said previous marker instruction, said diagnostic apparatus being operable to determine a position of said exception event from said previous marker instruction indicator and said counter value.

17. A diagnostic apparatus according to claim 16, said diagnostic apparatus further comprising a buffer operable to receive and store said data stream, prior to forwarding it to said decompression logic.

18. A diagnostic apparatus according to claim 16, wherein said indicators within said data stream comprise prediction indicators, said prediction indicators indicating if predictions made by logic within said data processing apparatus about a behavior of a portion of said data processing apparatus are correct or not, said diagnostic apparatus comprising:
    prediction logic operable to make predictions as to said behavior of said portion of said data processing apparatus, said predictions corresponding to predictions made by said logic within said data processing apparatus; and
    decompression logic operable to determine an actual behavior of said data processing apparatus from said predictions and said received data stream.

19. A system comprising a data processing apparatus according to claim 10, and a diagnostic apparatus operable to receive a data stream output from tracing logic monitoring a data processor, said data stream comprising indicators indicating a behavior of said data processor when marker instructions are processed and not comprising data relating to processed instructions that are not marker instructions, said marker instructions comprising conditional direct branch instructions, conditional indirect branch instructions and unconditional indirect branch instructions, said diagnostic apparatus comprising decompression logic and a data store, said data store being operable to store said instructions of said program being processed by said data processor, said decompression logic being operable to receive said data stream and to determine a program flow from said indicators of said marker instructions and said stored program, said system further comprising a program data store for storing said program and decompression logic said decompression logic being operable to receive data output by said compression logic and to determine a program flow from said indicators of said marker instructions and said stored program.

20. A method using tracing logic circuitry to monitor a stream of processing instructions from a program being processed by a data processor, said method comprising the steps of:
    detecting processing of said instructions in said instruction stream;
    detecting which of said instructions in said instruction stream are conditional direct branch instructions, and which of said instructions in said instruction stream are unconditional indirect branch instructions, or conditional indirect branch instructions;
    designating said conditional direct branch instructions, said conditional indirect branch instructions and said unconditional indirect branch instructions as marker instructions;
    for each marker instruction, outputting an indicator indicating a behaviour of said data processor when said marker instruction is processed and not outputting data relating to processed instructions that are not marker instructions, wherein, prior to outputting said indicator, said indicator is compressed.

21. A method using tracing logic circuitry to diagnose a program being processed by a data processor, comprising:
    receiving a data stream output from tracing logic circuitry monitoring a data processor, said data stream comprising indicators indicating a behavior of said data processor when marker instructions are processed and not comprising data relating to processed instructions that are not marker instructions, said marker instructions comprising conditional instructions and indirect branch instructions;
    storing said instructions of said program being processed by said data processor within a data store;
    determining a program flow of said program being processed from said indicators of said marker instructions and said stored program, wherein said data stream further comprises exception event indicators and counter values, said counter values indicating a number of instructions processed following said previous marker instruction, and a position of said exception event from said previous marker instruction indicator and said counter value.

22. A computer program product stored on a computer readable storage medium which is operable when run on a data processor to control the data processor to perform the steps of the method according to claim 21.

23. A method using tracing logic circuitry to monitor a stream of processing instructions from a program being processed by a data processor, said method comprising the steps of:
    detecting processing of said instructions in said instruction stream;
    detecting which of said instructions in said instruction stream are conditional direct branch instructions, and which of said instructions in said instruction stream are unconditional indirect branch instructions, or conditional indirect branch instructions;
    designating said conditional direct branch instructions, said conditional indirect branch instructions and said unconditional indirect branch instructions as marker instructions;
    for each marker instruction, outputting an indicator indicating a behaviour of said data processor when said marker instruction is processed and not outputting data relating to processed instructions that are not marker instructions:
    counting a number of non-marker instructions that are processed following each marker instruction using a counter;
    detecting an exception event; and in response to detection of said exception event, outputting an exception indicator indicating taking of said exception along with said counter value.

24. A method using tracing logic circuitry to monitor a stream of processing instructions from a program being processed by a data processor, said method comprising the steps of:

detecting processing of said instructions in said instruction stream;

detecting which of said instructions in said instruction stream are conditional direct branch instructions, and which of said instructions in said instruction stream are unconditional indirect branch instructions, or conditional indirect branch instructions;

designating said conditional direct branch instructions, said conditional indirect branch instructions and said unconditional indirect branch instructions as marker instructions;

for each marker instruction, outputting an indicator indicating a behaviour of said data processor when said marker instruction is processed and not outputting data relating to processed instructions that are not marker instructions;

determining if a behavior of at least one of said marker instructions can be determined from a behavior of previous marker instructions, and demoting said at least one marker instruction to an instruction that is not a marker instruction.

* * * * *